United States Patent [19]
Kaneda

[11] Patent Number: 5,854,711
[45] Date of Patent: Dec. 29, 1998

[54] LENS POSITION CONTROL DEVICE AND OPTICAL APPARATUS WITH DRIVING AND CONTROLLING OF FIRST AND SECOND LENSES

[75] Inventor: Naoya Kaneda, Kanagawa-ken, Japan

[73] Assignee: Canon Kabushiki Kaisha, Tokyo, Japan

[21] Appl. No.: 859,846

[22] Filed: May 21, 1997

Related U.S. Application Data

[63] Continuation of Ser. No. 596,586, Feb. 5, 1996, abandoned.

[30] Foreign Application Priority Data

Aug. 2, 1995 [JP] Japan ................................. 7-043597

[51] Int. Cl.$^6$ ............................. G02B 15/14; G02B 07/02
[52] U.S. Cl. ......................... 359/697; 359/696; 359/823
[58] Field of Search ................................. 359/813, 823, 359/822, 696, 697, 698; 354/400

[56] References Cited

U.S. PATENT DOCUMENTS

| | | | |
|---|---|---|---|
| 4,534,624 | 8/1985 | Toda | 354/704 |
| 4,920,369 | 4/1990 | Kaneda et al. | 354/400 |
| 4,924,253 | 5/1990 | Imai | 354/400 |
| 5,060,001 | 10/1991 | Kaneda | 354/400 |
| 5,134,525 | 7/1992 | Kaneda | 359/697 |
| 5,172,276 | 12/1992 | Ueyama | 359/813 |
| 5,302,991 | 4/1994 | Nakamura | 354/195.12 |
| 5,325,140 | 6/1994 | Torikoshi | 354/195 |
| 5,406,069 | 4/1995 | Hirasawa | 250/201.4 |
| 5,546,159 | 8/1996 | Imura | 354/472 |

FOREIGN PATENT DOCUMENTS

| | | |
|---|---|---|
| 1-280709 | 11/1989 | Japan . |
| 1-321416 | 12/1989 | Japan . |
| 3-27011 | 2/1991 | Japan . |

*Primary Examiner*—Georgia V. Epps
*Assistant Examiner*—Ricky Mack
*Attorney, Agent, or Firm*—Fitzpatrick, Cella, Harper & Scinto

[57] ABSTRACT

A lens position control device including a first lens movable along an axis, a first detector detecting a position of the first lens, a second lens movable along the axis, a second detector detecting a position of the second lens, and a controller for driving and controlling the lenses, including storing and position parts. The storing part stores information related to second lens positions with in-focus state retained respectively for a plurality of object distances with respect to each of a plurality of positions of the first lens. The position part is arranged to determine limit positions of a moving range of the first lens, to set at least one limit position (Ta) so a maximum difference between a second lens position where in-focus state is retained for a predetermined distance when the first lens is located at position (Ta) and a second lens position where in-focus state is retained for the predetermined distance when the first lens is located at another position (Za) coincides with a maximum value of contents in the storing part, and to cause the stored plurality of positions of the first lens within a range (M–T) which is smaller than the entire range of the first lens and extends toward another limit position (Wa) of the range from position (Ta) to correspond to positions determined on the basis of a moving amount of the first lens stored beforehand in the storing part from position (Ta).

18 Claims, 14 Drawing Sheets

3,854,711

LENS POSITION CONTROL DEVICE AND OPTICAL APPARATUS WITH DRIVING AND CONTROLLING OF FIRST AND SECOND LENSES

This application is a continuation of application Ser. No. 08/596,586 filed Feb. 5, 1996, now abandoned.

BACKGROUND OF THE INVENTION

1. Field of the Invention

This invention relates to a lens position control device and an optical apparatus such as a zoom lens, and more particularly to a lens position control device adapted for a so-called inner-focus or rear-focus type (hereinafter referred to as a rear-focus type) zoom lens which is employed in an optical apparatus such as a photographic camera using a 35 mm film or a video camera and which is arranged to carry out a focusing action with a lens group which is other than a first lens group on the side of the object of shooting and is located nearer to an image plane than a magnification varying lens system.

2. Description of the Related Art

The photographic cameras of the kind using 35 mm films and home video cameras or the like have recently come to be manufactured in smaller sizes and to have lighter weights. As a result, the rear-focus type zoom lenses are now being used for these optical apparatuses because they readily give desired magnification varying ratios and have wide angles of view, short total lens length and smaller front lens diameters and because the lens systems are small and light as a whole.

With a rear-focus type zoom lens being used, the apposite position of a focusing lens group in the direction of an optical axis is caused to vary with the magnification varying action of a magnification varying lens system even for one and the same object of shooting. Hence, the position of the focusing lens group must be controlled in a manner interlocked with the magnification varying action of the magnification varying lens system.

FIG. 1 is a sectional view showing the essential parts of a lens barrel of the conventional rear-focus type zoom lens. The zoom lens is composed of four lens groups which are arranged in sequence, as viewed from on the side of the object, including a fixed front lens group (a first lens group) 111, a variator lens group (a second lens group, which may be called a variator lens) 112 which is movable along an optical axis for varying a magnifying power, a fixed lens group (a third lens group) 113 and a lens group (a fourth lens group, which may be called a focusing lens) 114 which is movable along the optical axis for correcting a change in image plane resulting from a magnification varying action as well as for focusing.

Referring to FIG. 1, a guide bar 133 is arranged to prevent the second lens group 112 from turning. A variator feed bar 134 is arranged to be used in moving the second lens group (variator lens) 112. Reference numeral 135 denotes a fixed tube. An iris unit 136 is, in this case, inserted in the lens barrel perpendicular to the paper surface of the drawing. A focus motor 137 is, for example, a stepping motor and has an output shaft 138. The output shaft 138 is provided with a male screw part 138a which is formed in a part of the output shaft 138 for moving the fourth lens group 114. A female screw part 139 is in mesh with the male screw part 138a. The female screw part 139 is formed integrally with a moving frame 140 which is provided for moving the fourth lens group 114. The fourth lens group moving frame 140 is provided with guide bars 141 and 142. A back plate 143 is provided for positioning and holding the guide bars 141 and 142. A relay holder 144 is arranged to hold the third lens group 113. A zoom motor 145 is coupled with a reduction gear unit 146. Reference numerals 147 and 148 denote interlocking gears. The interlocking gear 148 is secured to the variator feed bar 134 which is provided for zooming.

With the lens barrel arranged in this manner, when the stepping motor 137 is driven, the fourth lens group (focusing lens) 114 which is provided for focusing is moved in the direction of an optical axis by the screw part 138a of the output shaft 138 of the stepping motor 137. When the zoom motor 145 is driven, the gears 147 and 148 are rotated by the motor 145 to cause the variator feed bar 134 to rotate. The rotation of the variator feed bar 134 in turn causes the second lens group (variator lens) 112 to move in the direction of the optical axis.

FIG. 7 shows locus data of a positional relation obtained between the second lens group (variator lens) 112 and the fourth lens group (focusing lens) 114 in the direction of the optical axis in an in-focus state for an object of shooting located at each of several object distances. The object distances shown by way of example in this case include an infinity distance ($\infty$), 2 m, 1 m, 80 cm and 0 cm. In the case of the rear-focus type zoom lens, the positional relation between the variator lens 112 and the focusing lens 114 as shown in FIG. 2 varies according to the object distance. Unlike a zoom lens of the kind arranged to perform focusing with a front lens, it is impossible to move the lens groups for zooming in an interlocked state by simple means such as a cam ring.

Therefore, the practice has been to control and optimize the positional relation between the variator lens 112 and the focusing lens 114 according to the object distance on the basis of information about the focusing lens moving loci which are as shown in FIG. 7.

For example, methods of tracing a locus of relation between the positions of the two lenses in the direction of an optical axis according to the object distance have been proposed in Japanese Laid-Open Patent Applications No. HEI 1-280709 and No. HEI 1-321416.

FIGS. 2 and 3 are diagrams for explaining the method proposed in Japanese Laid-Open Patent Application No. HEI 1-280709 for maintaining the positional relation between the variator lens and focusing lens in the direction of an optical axis in an optimum manner.

Referring to FIG. 2, which is a block diagram, lens groups 111 to 114 are the same as those shown in FIG. 1. The position of the variator lens 112 in the direction of an optical axis is detected by a zoom encoder 149. The zoom encoder 149 is, for example, a volume encoder which is arranged to have a brush integrally attached to a variator moving ring and to slide the brush over a circuit board on which a resistance pattern is printed. An iris aperture encoder 150 is arranged to detect an aperture value by using, for example, an output of a Hall element disposed within an iris meter. An image sensor 151 is composed of a CCD or the like. A camera processing circuit 152 is arranged to supply an AF (automatic focusing) circuit 153 with a Y signal included in signals obtained from the image sensor 151. The AF circuit 153 makes a discrimination between an in-focus state and a defocus state and, in the event of defocus, makes a discrimination between a near-focus state and a far-focus state and also determines the degree of defocus. The results of discrimination and determination made by the AF circuit 153 are taken into a CPU 154.

A power-on reset circuit 155 is arranged to perform various reset actions when a power supply is turned on. A zoom operation circuit 156 is arranged to supply the CPU 154 with information about an operation when a zoom switch 157 is operated by the operator. Reference numerals 158 to 160 denote memory parts of stored locus data shown in FIG. 7, i.e., a direction data part 158, a speed data part 159 and a boundary data part 160. Reference numeral 161 denotes a zoom motor driver and reference numeral 162 denotes a stepping motor driver. The number of pulses which are inputted to a stepping motor 137 is counted continuously by a counter arranged within the CPU 154 as an encoder to detect the absolute position of the focusing lens 114. With the zoom lens arranged in this manner, the position of the variator lens 112 and that of the focusing lens 114 are determined by the output value from the zoom encoder 149 and the number of input pulses from the stepping motor driver 162, so that one point can be determined on a map of the locus data shown in FIG. 7.

The map shown in FIG. 7 is divided into small oblong rectangle areas I, II, III, - - - as shown in FIG. 8. In FIG. 8, parts shown with hatching are areas where the lenses are inhibited from being set. With one point thus determined on the map, one of the small areas where the point is located can be accurately detected.

The rotating speed and the rotating direction of the stepping motor obtained from a locus passing through a center of each of the above-stated small areas are stored as the speed data and the direction data for each of the small areas. In the case of FIG. 8, for example, an abscissa axis (indicating the position of the variator lens) is divided into ten zones. Assuming that the speed of the zoom motor is set to move the variator lens from a telephoto end position T to a wide-angle end position W in ten seconds, a length of time required in passing one zone in the direction of zooming is one second. The area III of FIG. 8 is shown in an enlarged state in FIG. 3. Referring to FIG. 3, a locus 164 passes the center of the area III while a locus 165 passes a lower left part and another locus 166 passes an upper right part of the area III. These loci 164, 165 and 166 somewhat differ in inclination. In this case, the central locus 164 can be accurately traced without much error by moving the focusing lens at a rate of x mm/1 sec.

With the speed thus obtained assumed to be called as an area representative speed, values of the area representative speeds are stored at the speed memory for the respective small areas as many as the number of the small areas. Further, with this speed assumed to be indicated as a locus 168, the speed of the stepping motor is set, for example, by finely adjusting the area representative speed to a locus 167 or a locus 169, according to the result of detection made by an automatic focus adjusting device. Further, in zooming from the telephoto end to the wide-angle end (and vice versa), the rotating direction of the stepping motor varies according to the individual area of zooming. Therefore, sign data indicative of the rotating directions of the stepping motor is also stored as the direction data.

As described above, the position of the focusing lens 114 is controlled by driving the stepping motor 137, during the process of driving the zoom motor 145, at a stepping motor speed which is determined by correcting, according to the result of detection made by the automatic focus adjusting device, the area representative speed which is obtained from the positions of the variator lens 112 and the focusing lens 114. This method permits even a rear-focus type zoom lens to be adequately focused while a zooming action is in process.

In another known method, different speeds such as the above-stated loci 167 and 169 are also stored for each area in addition to the area representative speed 168, and one of the three different speeds is selected according to the result of detection made by the automatic focus adjusting device.

According to the known method as described above, the position of the focusing lens is controlled not only by storing the speeds, but also by computing a locus passing one point on a map determined from the current positions of the variator lens and the focusing lens and tracing the locus on the map. According to another known method, a plurality of loci are stored as positions of the focusing lens for each of different positions of the variator lens.

In Japanese Laid-Open Patent Application No. HEI 1-321416, there is disclosed a method for computing the position of the focusing lens. According to this method, positions of the focusing lens respectively corresponding to a plurality of positions of the variator lens between the wide-angle end and the telephoto end are stored beforehand with respect to a plurality of object distances. At the commencement of zooming, a point where the position of the variator lens and that of the focusing lens are located within a map is found. Then, interpolating computation is performed on that point on the basis of data stored for an object distance nearest on the near-focus side at the same focal length and data stored for an object distance nearest on the rear-focus side at the same focal length, so that position of the focusing lens for the current object distance at respective focal lengths (at respective positions of the variator lens) are computed.

FIG. 4 shows loci obtained in the neighborhood of the telephoto end. In the case of Japanese Laid-Open Patent Application No. HEI 1-321416, as stored data, there is stored information about positions of the focusing lens rr1, rr4, rr7 and rr9 which correspond to positions of the variator lens Vn (telephoto end position), Vn-1, Vn-2 and Vn-3 for the locus shown in the area I of FIG. 8 (such as an in-focus locus for an infinity object distance ∞). In other words, a locus LL1 which passes points P1, P4, P7 and P10 within the map is stored as the in-focus locus for an infinity object distance ∞. Information about positions of the focusing lens rr2, rr5, rr8 and rr11 corresponding to the positions of the variator lens Vn (telephoto end position), Vn-1, Vn-2 and Vn-3 is likewise stored as a locus LL2 which is, for example, an in-focus locus for the object distance of 10 m. Such data is of course stored in this manner, covering the whole zoom area from the wide-angle end to the telephoto end.

Referring to FIG. 4, in varying the magnifying power (zooming) from a point (Vn, rr), i.e., a point P within the map, the values of points PA, PB, and PC are obtained from this point P by interpolating computation on the basis of data stored for an object distance nearest on the near-focus side, i.e., data of the locus LL2, and data stored for an object distance nearest on the far-focus side, i.e., data of the locus LL1, for the same position of the variator lens. A locus to be used during the process of zooming is determined by obtaining in this manner the positions of the focusing lens for the focal lengths varying during the process of zooming, including focal lengths V0 (obtained at the wide-angle end), V1, V2, - - - Vn-1 and Vn (obtained at the telephoto end).

The above interpolating computation is performed on the assumption that a ratio of a distance between the points P1 and P to a distance between the points P2 and P is equal, for example, to a ratio of a distance between the points PA and P4 to a distance between the points PA and P5.

Such data concerning the speeds of the focusing lens or such data concerning the positions of the focusing lens are prepared, as a matter of course, on the basis of optical design values with manufacturing errors assumed to be zero.

Further, in the case of this example, a DC motor having a gear head is employed as a zooming actuator. In another known method, however, a stepping motor is employed for zooming in the same manner as for the focusing lens and the absolute position of the lens group is found by counting a number of input pulses with a reset position used as a datum position in the same manner as in focusing without using a volume type variator encoder.

According to a further known method, a photo-interrupter is employed for obtaining a datum position in using a focusing motor of the above-stated kind.

While the zoom tracking data as stored is prepared on the basis of optical design values as mentioned above, the actual loci of data differ from the design values due to errors in focal length of each lens group, etc. Therefore, in a video camera or the like actually manufactured, among the stored data, the positions of the variator lens which correspond to the telephoto end and the wide-angle end are adjusted so as to be correlated to specified values of the outputs of the zoom encoder (or the number of pulses after the above-stated datum position in a case where a stepping motor is used), i.e., to specified positions of the variator lens, and the telephoto and wide-angle end positions determined through the adjustment process are written into an $E^2PROM$.

According to a known method conventionally employed, the stroke of the variator lens from the telephoto end position to the wide-angle end position is maintained at a design value, and positions where a difference (balance) between in-focus positions of the focusing lens obtained at the telephoto and wide-angle ends for an adjustment object distance (such as an infinity distance $\infty$) comes to coincide with a design value are obtained. Then, these positions are decided to be the telephoto and wide-angle end positions. Hereinafter, the process of this method will be called as "stroke fixing adjustment".

According to a further known method, a difference (balance) between in-focus positions of the focusing lens obtained at the telephoto and wide-angle ends for an adjustment object distance (such as an infinity distance $\infty$) is made to be a design value in a locus such as one of those shown in FIG. 7, and, the telephoto end position of the variator lens where the amount of movement of the focusing lens from the highest position of the focusing lens on the map of FIG. 7 for a middle (intermediate) focal length to the position of the focusing lens for the telephoto end becomes a design value is obtained, so that the telephoto and wide-angle end positions of the variator lens are obtained. The process of that method will hereinafter be called "tele-middle tracking adjustment".

Next, referring to FIG. 5, such a situation is explained where each of the stroke fixing adjustment and the tele-middle tracking adjustment is performed on a lens group which has such an error that a difference of the position of the focusing lens for the middle focal length from that for the telephoto end becomes larger than a design value.

In FIG. 5, the position of the variator lens, i.e., focal length, is shown on the abscissa axis and the position of the focusing lens is shown on the ordinate axis, like in the case of FIG. 7. A locus Sb indicated by two-dot chain line represents design values. A locus Sa indicated with a full line represents actual positions of the focusing lens.

In this case, for example, a difference between the positions of the focusing lens obtained at the telephoto and wide-angle ends for an infinity object distance $\infty$ is assumed to be zero.

Supposing that the locus is not deviating from the design values, in a case where the tele-middle tracking adjustment is to be performed, a point (1)' on the map becomes a start point of the adjustment. From this point (1)', the position of the focusing lens is lowered, as viewed on the drawing, as much as the moving amount A for the design values of the focusing lens. The lowered position thus obtained becomes a point (2)'. Under this condition, when the variator lens is laterally moved, as viewed on the drawing, an in-focus position is obtained at a point (5). The point (5) is considered to be the telephoto end position of the variator lens. Further, since the difference between the in-focus positions of the focusing lens obtained at the wide-angle end and at the telephoto end is zero in this case as mentioned above, a point (6) where an in-focus state is obtained by similarly moving the variator lens is considered to be the wide-angle end position of the variator lens.

In the case of the stroke fixing adjustment, on the other hand, the stroke and the balance are adjusted to predetermined values even if the locus of design values has errors as indicated by the full line. Therefore, if the errors take place in such a way as shown in the drawing, the telephoto end position is obtained at the point (5) and the wide-angle end position at the point (6) in both cases.

In a case where a lens having the locus Sa shown with the full line is subjected to the tele-middle tracking adjustment, when the focusing lens is moved from the start point (1) of the adjustment as much as the design-value moving amount A downward as viewed on the drawing, the position of the focusing lens comes to a point (2) instead of the point (2)'. When the variator lens is moved to an in-focus position in the same manner as mentioned above from this point (2), the telephoto end position of the variator lens is obtained at a point (3) while the wide-angle end position of the variator lens is obtained at a point (4).

As mentioned above, in a case where the full line locus involves errors from the design value locus shown with the two-dot chain line to cause the height of a hill of the locus as shown in FIG. 5, the stroke fixing adjustment gives the telephoto end position at the point (5) and the wide-angle end position at the point (6) while the tele-middle tracking adjustment gives the telephoto end position at the point (3) and the wide-angle end position at the point (4).

In other words, in the case of the stroke fixing adjustment, although the stroke of the variator lens from the telephoto end over to the wide-angle end becomes the same as the design value, the amount of movement of the focusing lens from an in-focus position for the telephoto end (or wide-angle end) to an in-focus position for the middle focal length (obtained when the variator lens is at the point (1) or (2)) becomes "A+$\Delta$A", including an error $\Delta$A in addition to the design-value moving amount A.

In the case of the tele-middle tracking adjustment, on the other hand, although the moving amount of the focusing lens coincides with the design value A, the stroke required for the variator lens to move from the telephoto end to the wide-angle end becomes a stroke S', which is shorter than a design value S by $\Delta$SW plus $\Delta$ST.

FIG. 6 shows a relation between the position of the variator lens and the focal length. Although some amount of error takes place in actuality even in the case of the stroke fixing adjustment, the stroke fixing adjustment in this case is assumed to give focal lengths in conformity with design values. Then, the focal length becomes, for example, 4 mm at the point (6) which is the wide-angle end position and becomes 40 mm at the point (5) which is the telephoto end position. Hence, the relation shown corresponds to a zoom lens having a zoom ratio of ten magnifications.

In a case where the tele-middle tracking adjustment is employed, on the other hand, the wide-angle end position is obtained at the point (4), where the focal length is 5.3 mm. Meanwhile, the telephoto end position is obtained at the point (3), where the focal length is 36 mm. In this case, therefore, the zoom ratio becomes only seven magnifications and is much lower than the design value.

In actuality, the zoom lens is manufactured by controlling the focal length and the position of each lens group in such a way as to prevent the occurrence of such an error that causes the focal length to fluctuate to such an extent mentioned above. For this purpose, the focal lengths at the wide-angle end and the telephoto end and the zoom ratio are being controlled to be within a predetermined range with respect to design values.

FIG. 11 shows the output of a zoom encoder obtained after the adjustment shown in FIG. 5. The output of the zoom encoder is assumed to be obtained in the form of a voltage.

Referring to FIG. 11, in the case of the stroke fixing adjustment, the output becomes 0.5 V at the wide-angle end and 3 V at the telephoto end. In a case where the tele-middle tracking adjustment is performed, on the other hand, the output becomes 0.88 V at the wide-angle end and 2.96 V at the telephoto end. In this case, data concerning the loci stored in a storage means disposed within the CPU 154 mention above is assumed to include positions of the focusing lens corresponding to a plurality of positions of the variator lens for the adjustment object distance. The plurality of positions of the variator lens are assumed herein to be data obtained by equally dividing a moving range of the variator lens from the telephoto end to the wide-angle end into 33 zones. In this case, since the output of the zoom encoder which ranges from 0.5 V to 3 V is divided into 33 parts, an address 0 is made to correspond to 0.5 V, an address 1 is made to correspond to 0.5+(3−0.5)/33=0.576 V, an address 2 is made to correspond to 0.5+2×(3−0.5)/33=0.652 V, and so on.

In the case of the tele-middle tracking adjustment, the address 0 is made to correspond to 0.88 V, the address 1 is made to correspond to 0.88+(2.96−0.88)/33=0.943 V, the address 2 is made to correspond to 0.88+2×(2.96−0.88)/33= 1.006 V, and so on.

The results of such a correspondence arrangement are shown in FIG. 5. As shown in the upper right corner of FIG. 5, a moving amount C of the variator lens corresponds to the moving amount for one address in the tele-middle tracking adjustment. Another moving amount B of the variator lens corresponds to the moving amount for one address in the stroke fixing adjustment. According to the pitch thus determined, the positions of addresses 28 to 33 in the tele-middle tracking adjustment are arranged as shown above the locus and the positions of addresses 29 to 33 in the stroke fixing adjustment are arranged as shown below the locus in FIG. 5.

While the situation obtained in each of the two adjustment methods has been described above, the amounts of defocus resulting from the respective two adjustment methods are shown in Table 1 and Table 2 below.

TABLE 1

| | wide-angle end | | | | telephoto end | | | | |
|---|---|---|---|---|---|---|---|---|---|
| Memory (design) values: | | | | | | | | | |
| variator address: | 0 | 1 | 2 | ~20 | ~29 | 30 | 31 | 32 | 33 |
| RR address: | 0 | 1 | 2 | 38 | 36 | 32 | 26 | 15 | 0 |

TABLE 1-continued

| | wide-angle end | | | | telephoto end | | | | |
|---|---|---|---|---|---|---|---|---|---|
| By stroke fixing adjustment: | | | | | | | | | |
| stroke fixing RR: | 0 | 1 | 2 | 40 | 41 | 36 | 30 | 17 | 0 |
| blur in middle: | 0 | 0 | 0 | −2 | −5 | −4 | −4 | −2 | 0 |

TABLE 2

| | wide-angle end | | | | telephoto end | | | | |
|---|---|---|---|---|---|---|---|---|---|
| Memory (design) values: | | | | | | | | | |
| variator address: | 0 | 1 | 2 | ~20 | ~29 | 30 | 31 | 32 | 33 |
| RR address: | 0 | 1 | 2 | 38 | 36 | 32 | 26 | 15 | 0 |
| By T-M tracking adjustment: | | | | | | | | | |
| T-M tracking RR: | 0 | 1 | 2 | 40 | 33.3 | 29.6 | 24.2 | 14.2 | 0 |
| blur in middle: | 0 | 0 | 0 | −2 | 2.7 | 2.4 | 1.8 | 0.8 | 0 |

Table 1 shows values obtained by carrying out the stroke fixing adjustment. In this case, information on the values of positions to be taken by the focusing lens at the addresses 0 to 33 of the variator lens is stored on the basis of the design values as "0" at the address 0, "1" at the address 1, "2" at the address 2, - - - , "38" at the address 20, - - - , "36"0 at the address 29, "32" at the address 30, "26" at the address 31, "15" at the address 32, and "0" at the address 33. (In actuality, however, the data is more finely arranged than what is shown.)

If the actual positions of the focusing lens where in-focus states are obtainable for the respective positions of the variator lens after the stroke fixing adjustment are roughly read out from FIG. 5, as shown in Table 1, the values of the positions of the focusing lens are "0" at the address 0, "1" at the address 1, "2" at the address 2, - - - , "40" at the address 20, "41" at the address 29, "36" at the address 36, "30" at the address 31, "17" at the address 32 and "0" at the address 33.

These values imply that, if the position of the focusing lens is controlled during zooming exactly in conformity to the data stored, there arises some deviation during the process of zooming. The amount of deviation (blur) is, for example, "−5" at the address 29 and "−4" at the address 30. In moving the focusing lens by means of a stepping motor, such values of deviation either relate to the number of input pulses or become the very number of pulses.

Table 2 above indicates the values obtained through the T-M (tele-middle) tracking adjustment. In that case, some deviation also arises during the process of zooming between the in-focus positions of the focusing lens and its passing positions. For example, the amount of deviation, or blur, is "2.7" at the address 29 and "2.4" at the address 30.

If the deviation causes only a blur which is less than an allowable circle of confusion, it presents no problem for the operator of the camera.

In view of w hat is described above, the results obtained by the two adjustment methods differ from each other in the following points.

(a) The stroke fixing adjustment results in a larger blur in the middle focal length range of zooming, while the focal length can be prevented from fluctuating.

(b) Conversely, the tele-middle tracking adjustment gives a less amount of blur in the middle focal length range of zooming than the stroke fixing adjustment but tends to cause the fluctuations of the focal length.

As mentioned in the foregoing, heretofore, the fluctuations of the focal length or the amounts of blur taking place in the middle focal length range of zooming have been suppressed to an allowable level by a manufacturing process of controlling errors. However, it has recently become difficult to effectively suppress the error of focal length or the amount of blur taking place in the middle focal length range of zooming by the conventional manufacturing process of controlling errors, due to the following changes in the background.

(i) The zoom ratio required for zoom lenses to be used for video cameras is increasing year after year. While the zoom ratio normally required several years ago was about eight magnifications or thereabout, the zoom ratio of the zoom lenses manufactured these days is 12 magnifications or 18 magnifications. The upward trend is expected to continue further in the future.

(ii) The above-stated locus has become more readily affected by fluctuations in positional precision of each lens group and in focal length as a result of the upward trend mentioned in the above paragraph (i).

(iii) The diametric size of the image sensors (CCDs) has already been reduced from ⅓ inch to ¼ inch. The need for reduction in size of the image sensors is expected to still continue in the future. However, if the power of each lens group is increased to cope with the reduction in size of the image sensor, the locus in question is apt to be affected by the increase in power.

SUMMARY OF THE INVENTION

A first object of this invention is to provide a lens position control device arranged to be capable of reducing or eliminating a blur taking place in the middle focal length range of zooming, and an optical apparatus such as a zoom lens using the lens position control device.

A second object of this invention is to provide a lens position control device which is arranged not only to reduce or eliminate a blur taking place in the middle focal length range of zooming but also to effectively reduce or eliminate errors in focal length, and an optical apparatus such as a zoom lens using the lens position control device.

A third object of this invention is to provide a lens position control device and a rear-focus type zoom lens arranged to be capable of setting a focusing lens in an adequate position on an optical axis in relation to each of the positions of a variator lens on the optical axis in such a way as to reduce a blur and the error of a magnification varying ratio over the whole range of zooming.

A lens position control device according to a first aspect of this invention comprises a first lens arranged to be movable along an optical axis, first lens position detecting means for detecting a position of the first lens in the direction of the optical axis, a second lens arranged to be movable along the optical axis, second lens position detecting means for detecting a position of the second lens in the direction of the optical axis, and driving control means for driving and controlling the first and second lenses, the driving control means including a storing part and a position setting part. In the storing part, is stored information related to positions of the second lens at which an in-focus state can be retained respectively for a plurality of object distances with respect to each of a plurality of positions of the first lens. The position setting part is arranged to determine limit positions of a moving range of the first lens in the direction of the optical axis, to set at least one limit position Ta of the moving range to such a position of the first lens that a maximum value of difference between a position of the second lens where an in-focus state can be retained for a predetermined object distance when the first lens is located at the one limit position Ta of the moving range and a position of the second lens where an in-focus state can be retained for the predetermined object distance when the first lens is located at another position Za within the moving range coincides with a maximum value of contents stored in the storing part, and to cause the stored plurality of positions of the first lens within a moving range (M–T) which is smaller than the entire moving range of the first lens and which extends toward another limit position Wa of the moving range from the one limit position Ta to correspond to positions determined on the basis of a moving amount of the first lens stored beforehand in the storing part from the one limit position Ta.

In particular, the driving control means is arranged to set as a reference a position TB of the second lens where an in-focus state can be retained for the predetermined object distance when the first lens is located at the one limit position Ta of the moving range, to obtain a new position Wa where an in-focus state can be retained after moving the second lens by a predetermined moving amount Ya from the reference, to set the new position Wa in the position setting part as the other limit position of the moving range of the first lens, and to cause the stored plurality of positions of the first lens within a remaining moving range (W–M) obtained by subtracting the smaller moving range (M–T) from the entire moving range of the first lens toward the one limit position Ta from the other limit position Wa of the moving range to correspond to positions determined on the basis of such a moving amount of the first lens that the stored plurality of positions of the first lens correspond to the determined positions between the one limit position Ta and the other limit position Wa of the moving range without any excess and shortage.

A lens position control device according to a second aspect of this invention comprises a first lens arranged to be movable along an optical axis, first lens position detecting means for detecting a position of the first lens in the direction of the optical axis, a second lens arranged to be movable along the optical axis, second lens position detecting means for detecting a position of the second lens in the direction of the optical axis, and driving control means for driving and controlling the first and second lenses, the driving control means including a storing part and a position setting part. In the storing part, is stored information related to positions of the second lens at which an in-focus state can be retained respectively for a plurality of object distances with respect to each of a plurality of positions of the first lens. The position setting part is arranged to determine limit positions of a moving range of the first lens in the direction of the optical axis, to set as a reference a position TB of the second lens where an in-focus state can be retained for a predetermined object distance when the first lens is located at one limit position Ta of the moving range, to move the second lens from the reference to a position of the second lens stored in the storing part, and to cause a position of the first lens where an in-focus state can be retained with the stored position of the second lens to correspond to a stored position of the first lens.

In particular, the position setting part is arranged to set at least one limit position of the moving range to such a position of the first lens that a maximum value of difference between a position of the second lens where an in-focus state can be retained for the predetermined object distance when the first lens is located at the one limit position of the moving range and a position of the second lens where an in-focus state can be retained for the predetermined object distance when the first lens is located at another position within the moving range coincides with a maximum value of contents stored in the storing part.

A lens position control device according to a third aspect of this invention comprises a first lens arranged to be movable along an optical axis, first lens position detecting means for detecting a position of the first lens in the direction of the optical axis, a second lens arranged to be movable along the optical axis, second lens position detecting means for detecting a position of the second lens in the direction of the optical axis, and driving control means for driving and controlling the first and second lenses, the driving control means including a storing part and a position setting part. In the storing part, is stored information related to positions of the second lens at which an in-focus state can be retained respectively for a plurality of object distances with respect to each of a plurality of positions of the first lens. The position setting part is arranged to determine limit positions of a moving range of the first lens in the direction of the optical axis, to set at least one limit position Ta of the moving range to such a position of the first lens that a maximum value of difference between a position of the second lens where an in-focus state can be retained for a predetermined object distance when the first lens is located at the one limit position Ta of the moving range and a position of the second lens where an in-focus state can be retained for the predetermined object distance when the first lens is located at another position Za within the moving range coincides with a maximum value of contents stored in the storing part, and to set as another limit position Wa of the moving range of the first lens a position to which the first lens has moved a predetermined moving amount from the one limit position Ta.

In particular, the driving control means is arranged to set as a reference a position TB of the second lens where an in-focus state can be retained for the predetermined object distance when the first lens is located at the one limit position Ta of the moving range, to obtain a new position Wa' of the first lens where an in-focus state can be retained after moving the second lens a predetermined moving amount from the reference, to cause a position among the stored plurality of positions of the first lens which corresponds to one limit position of the moving range of the first lens to correspond to the one limit position Ta of the moving range, and to cause a position among the stored plurality of positions of the first lens which corresponds to another limit position of the moving range of the first lens to correspond to the new position Wa' of the first lens.

An optical apparatus according to this invention is characterized in that an object image is formed on a predetermined plane by using one of the lens position control devices according to the first, second and third aspects described above or by using them in combination.

These and other objects and features of this invention will become apparent from the following detailed description of embodiments thereof taken in connection with the accompanying drawings.

DETAILED DESCRIPTION OF THE PREFERRED EMBODIMENTS

Figure 9:
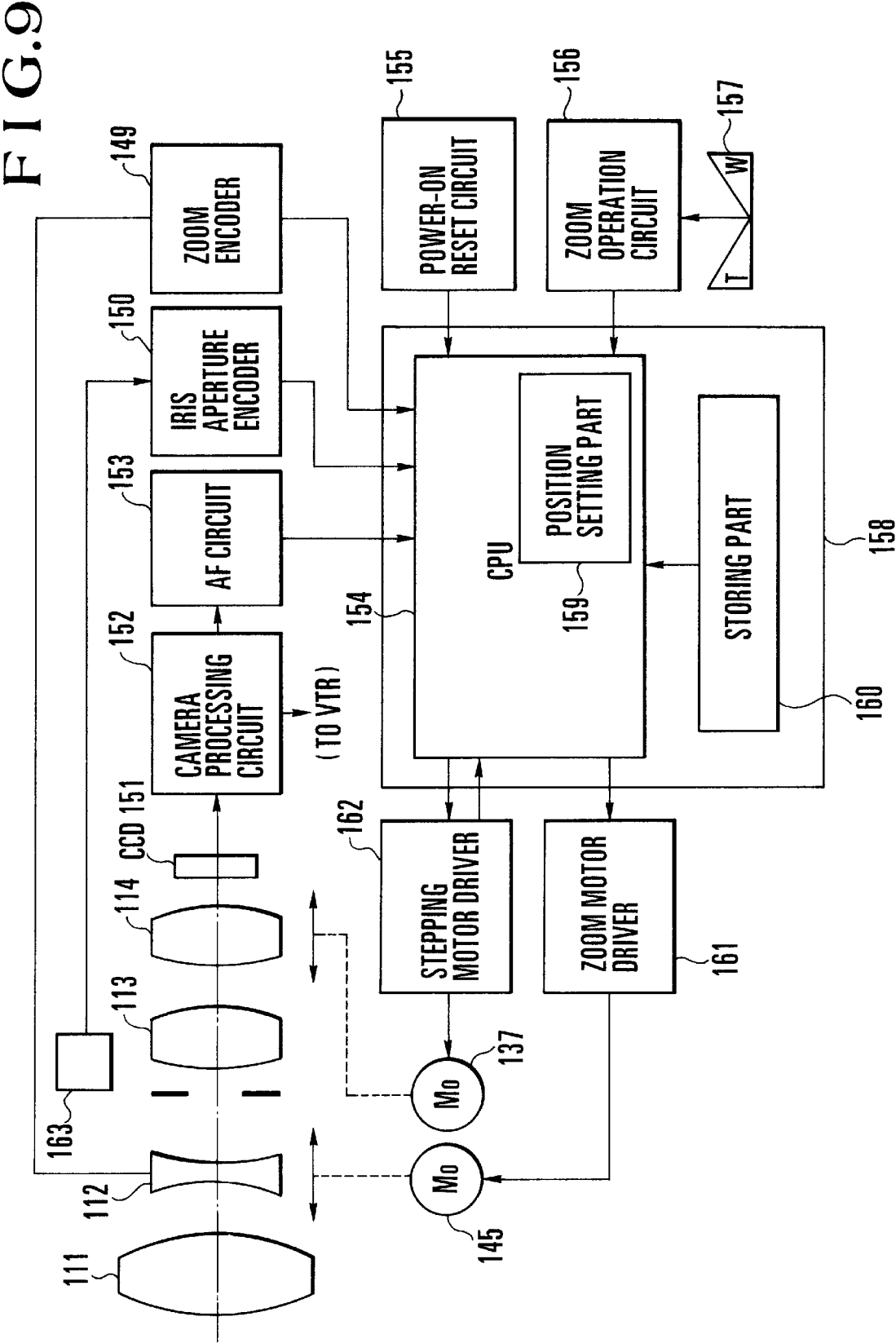
FIG. 9 is a block diagram showing essential parts of a first embodiment of this invention.

FIG. 9 shows in a block diagram essential parts of a zoom lens as a first embodiment of this invention.

The zoom lens is composed of four lens groups, which include in sequence, from an object side, a fixed front lens group 111, a variator lens group 112 (hereinafter may be referred to a s a variator lens) arranged to be movable along an optical axis for varying a magnification, a fixed lens group 113 and a focusing lens group 114 (hereinafter may be referred to as a focusing lens) arranged to be movable along the optical axis for focusing and for compensating for the image shift resulting from the varying of magnification.

The position of the variator lens 112 on the optical axis is detected by a zoom encoder 149. In this case, for example, the zoom encoder 149 is a volume encoder which has a brush integrally attached to a variator moving ring and arranged to slide over a circuit board on which a resistance pattern is printed. An iris aperture encoder 150 is arranged to detect the aperture value of an iris, for example, by using the output of a Hall element which is disposed within an iris meter. An image sensor 151 is a CCD or the like. A camera processing circuit 152 is arranged to receive signals from the image sensor 151 and to supply a Y signal included in these signals to an AF (automatic focusing) circuit 153. The AF circuit 153 is arranged to make a discrimination between in-focus and defocus states. In the event of a defocus state, the AF circuit 153 decides if it is a near-focus state or a far-focus state and also finds the amount of defocus. The results of decision made by the AF circuit 153 are supplied to a CPU 154.

A power-on reset circuit 155 is arranged to perform various reset actions when a power supply is turned on. A zoom operation circuit 156 is arranged to supply the CPU 154 with information on an operation when a zoom switch 157 is operated by the operator. The CPU 154 is included in a driving control means 158 and has a position setting part 159. Moving ranges within which the variator lens 112 and the focusing lens 114 are to be moved respectively are set by the position setting part 159 in a manner which will be described later herein. Locus data indicative of loci of the focusing lens 114 is stored in a storing part 160, which is included in the driving control means 158.

A zoom motor driver 161 is arranged to drive a zoom motor 145. A stepping motor driver 162 is arranged to drive a stepping motor 137 by applying input pulses to the stepping motor 137. The number of input pulses thus applied the stepping motor 137 is counted by a counter which is disposed within the CPU 154 as an encoder for encoding the absolute position of the focusing lens 114. With the zoom lens arranged in this manner, the position of the variator lens 112 and that of the focusing lens 114 are determined respectively by information on a value supplied from the zoom encoder 149 and information on the number of input pulses supplied from the stepping motor driver 162, so that one point can be decided on the map of the locus data shown in FIG. 7.

Data for zoom tracking prepared on the basis of design values of the zoom lens is stored in the storing part 160. In actuality, however, the loci of movement of the focusing lens 114 relative to the movement of the variator lens 112 do not coincide with the design values, due to some focal length error of each lens group.

Figure 7:
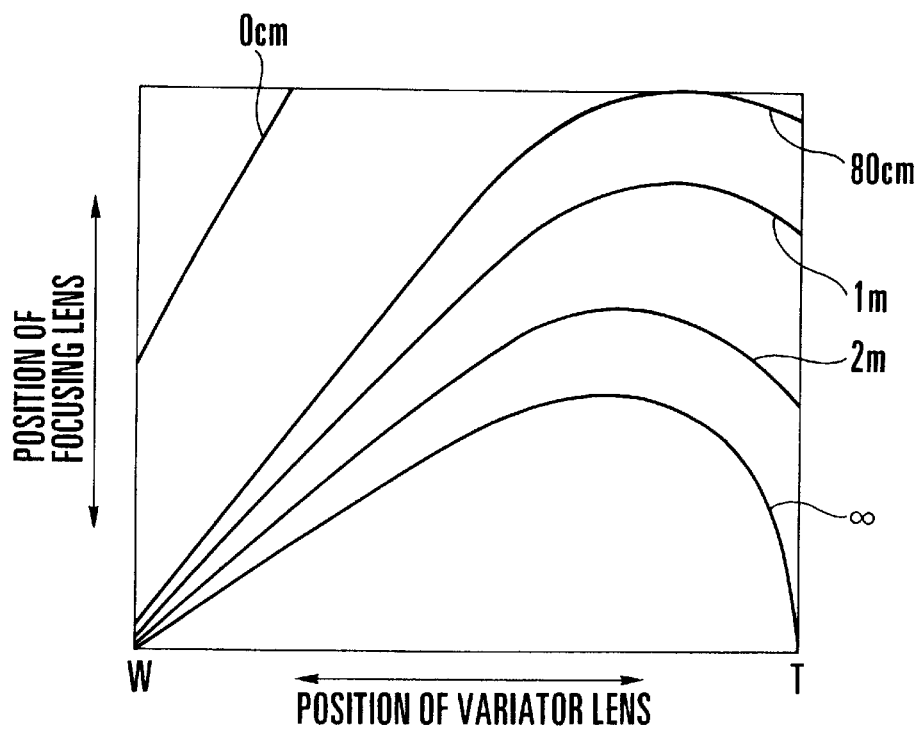
FIG. 7 shows a positional relation between a variator lens and a focusing lens in a lens barrel to which this invention applies.

In the case of this embodiment, the so-called tele-middle tracking adjustment is utilized, in which a difference (balance) between the in-focus positions of the focusing lens obtained at the telephoto end and the wide-angle end for an adjustment object distance (an infinite distance ∞, for example) on a locus such as the locus shown in FIG. 7 is made to coincide with a design value, and such a position of the variator lens at the telephoto end is obtained that the moving amount of the focusing lens from a middle focal length position where the focusing lens comes to a highest point on the map of FIG. 7 to a telephoto end position of the focusing lens becomes exactly the same as a design value, so that positions at the telephoto end and the wide-angle end of the variator lens are determined.

A feature of the arrangement of this embodiment is next described with reference to FIG. 10 as follows.

In determining the position on an optical axis of the focusing lens which is provided as a so-called compensator for correcting a change taking place on an image plane as a result of a magnification varying action as well as for focusing, positions of a telephoto end Ta and a wide-angle end Wa are first determined through the tracking adjustment between the telephoto end Ta and a middle focal length position M, i.e., the tele-middle tracking adjustment. Secondly, within an area M–T from the telephoto end Ta toward the wide-angle end Wa to a position Za which corresponds to the top of actual measured values,of actual measured values, a value corresponding to a design value is applied as a moving amount of the variator lens corresponding to one address of data of positions of the variator lens stored in the storing part 160. Thirdly, in order to cause the stored data to correspond to a stroke determined by the tele-middle tracking adjustment from the telephoto end Ta to the wide-angle and Wa, a moving amount corresponding to one address of the variator lens is determined within a remaining area W–M from a position of the variator lens near the top of the hill of the locus Sa, i.e., the zoom position Za, to the wide-angle end Wa.

Figure 10:
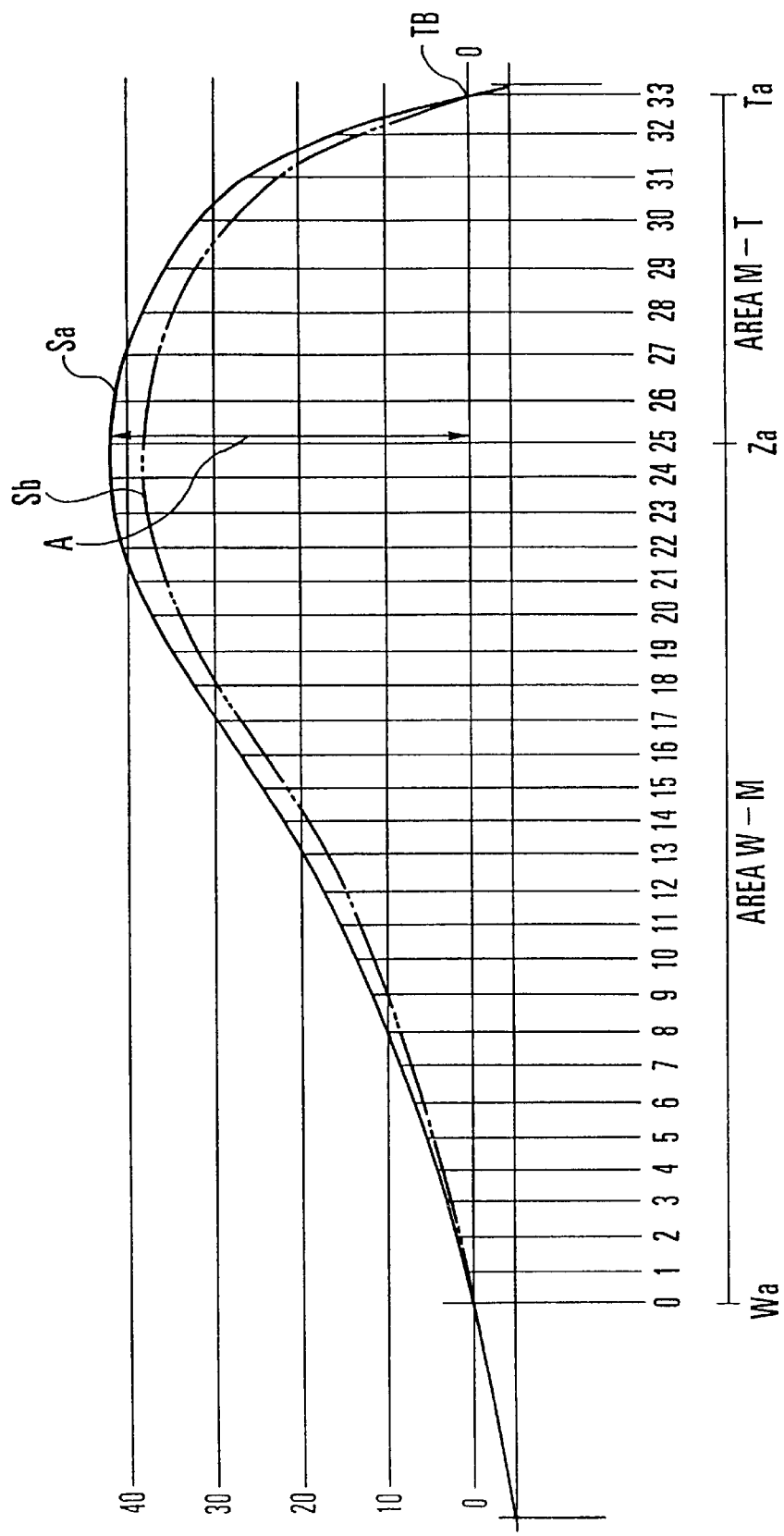
FIG. 10 shows an actual locus of the focusing lens and the positions of the variator lens of stored data made to correspond to the actual locus in the first embodiment.

FIG. 10 shows in a full line the locus Sa of a zoom lens actually manufactured in relation to a locus Sb of design values which is shown in a two-dot chain line. In the case of this embodiment, positions at the telephoto end Ta and at the wide-angle end Wa of the variator lens are first determined in accordance with the tele-middle tracking adjustment mentioned in the foregoing. Then, the position at the telephoto end Ta of the variator lens corresponds to an address 33 included in the locus data as stored.

Figure 11:
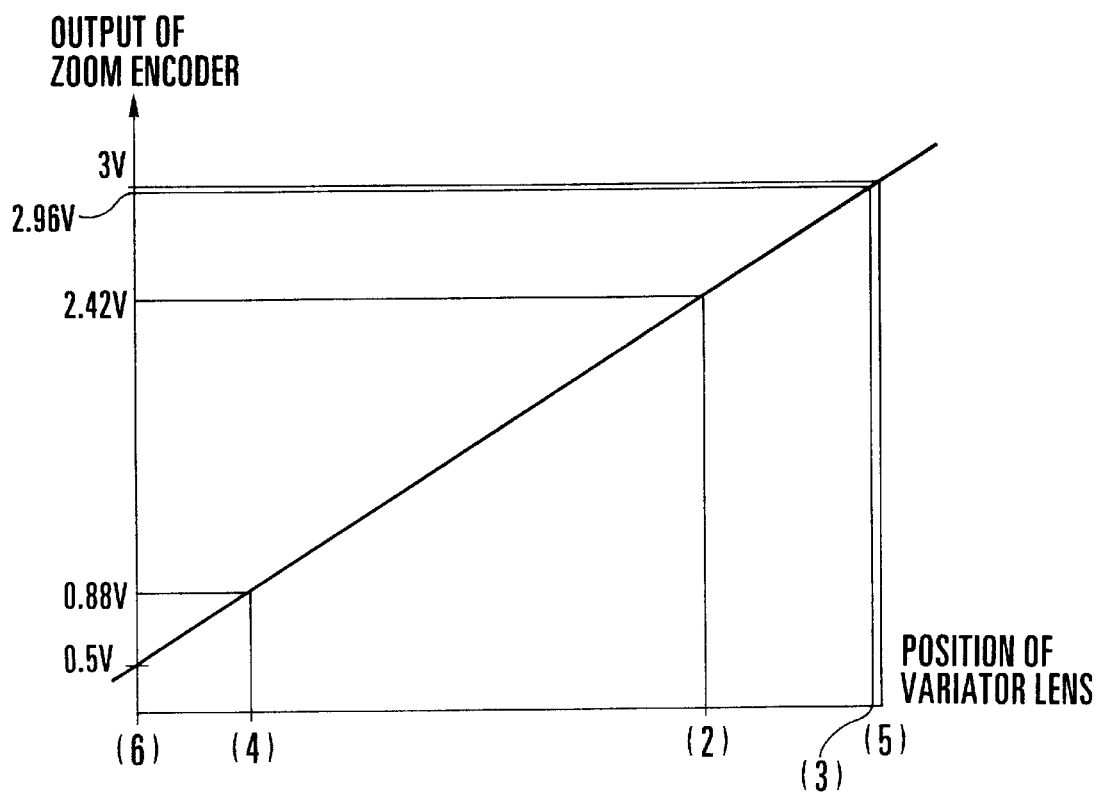
FIG. 11 shows a zoom tracking adjustment method.

As a feature of the first embodiment, next, in the range from the address 33 to a point near the top of the hill of the locus, i.e., to an address 25 at the zoom position Za in the case of FIG. 10, the position of the variator lens at each address is determined according to the dividing pitch of a design value. For example, assuming that the design value of the moving amount of the variator lens between the telephoto end and the wide-angle end is 33 mm, a design value of the moving amount of the variator lens corresponding to one address becomes 1 mm if data is prepared to have 33 addresses as shown in FIG. 10. In actuality, as shown in FIG. 11, assuming that the zoom encoder is of such a characteristic that its output varies by $\Delta V$ (V) when the variator lens moves 1 mm and that the output indicates VT at the telephoto end (2.96 V in the case of FIG. 11), the output becomes "VT−$\Delta V$" at the address 32, "VT−2×$\Delta V$" at the address 31, and so on.

Incidentally, although the zoom encoder is actually prepared to indicate a change of output by $\Delta V$ for every moving amount of 1 mm, if the gain of the output of the zoom encoder fluctuates, it is preferable to measure the value of $\Delta V$ peculiar to the zoom encoder beforehand and to use the measured peculiar value.

Further, in a case where a stepping motor is employed as the zoom encoder, a value corresponding to the output $\Delta V$ becomes a predetermined number of pulses. In that case, therefore, the above-stated arrangement of measuring the output beforehand is not necessary.

After the moving amount of the variator lens corresponding to every one address of the addresses 25 to 33 is thus set, a moving amount of the variator lens corresponding to every one address of the addresses 0 (wide-angle end) to 25 is set according to such a dividing pitch that 33 addresses are assigned to the whole range from the telephoto end to the wide-angle end.

In the case of the embodiment described by way of example above, all the data stored is prepared as data of positions of the focusing lens on the optical axis with respect to a plurality of positions of the variator lens obtained by equally dividing a designed range from the telephoto end to the wide-angle end. The arrangement described above is applicable, for example, even to a case where the range of positions of the variator lens is divided finely on the telephoto side and roughly on the wide-angle side. Thus, a main gist of this embodiment lies in that, in a case where there is some error in the moving locus of the focusing lens, any blur which would take place at a middle focal length position of a zooming area is eliminated by varying, according to the position of the variator lens, the actual moving amount of the variator lens corresponding to every one address of the zooming area, from the data prepared on the basis of design values.

Further, in the case of FIG. 10, the address 25 is selected as a boundary address at which the dividing pitch is changed between the telephoto end and the wide-angle end. However, the position Za of the variator lens which corresponds to this boundary address does not have to be at the address 25. Any address other than the address 25 can be selected without much affecting the performance of the embodiment, as long as the position Za is in the neighborhood of the middle focal length position.

In FIG. 10, within a range indicated as the area M–T, addresses are spaced at the pitch based on the design value. Within another range indicated as the area W–M, addresses are spaced at such a dividing pitch that effectively absorbs a stroke error.

Figure 12:
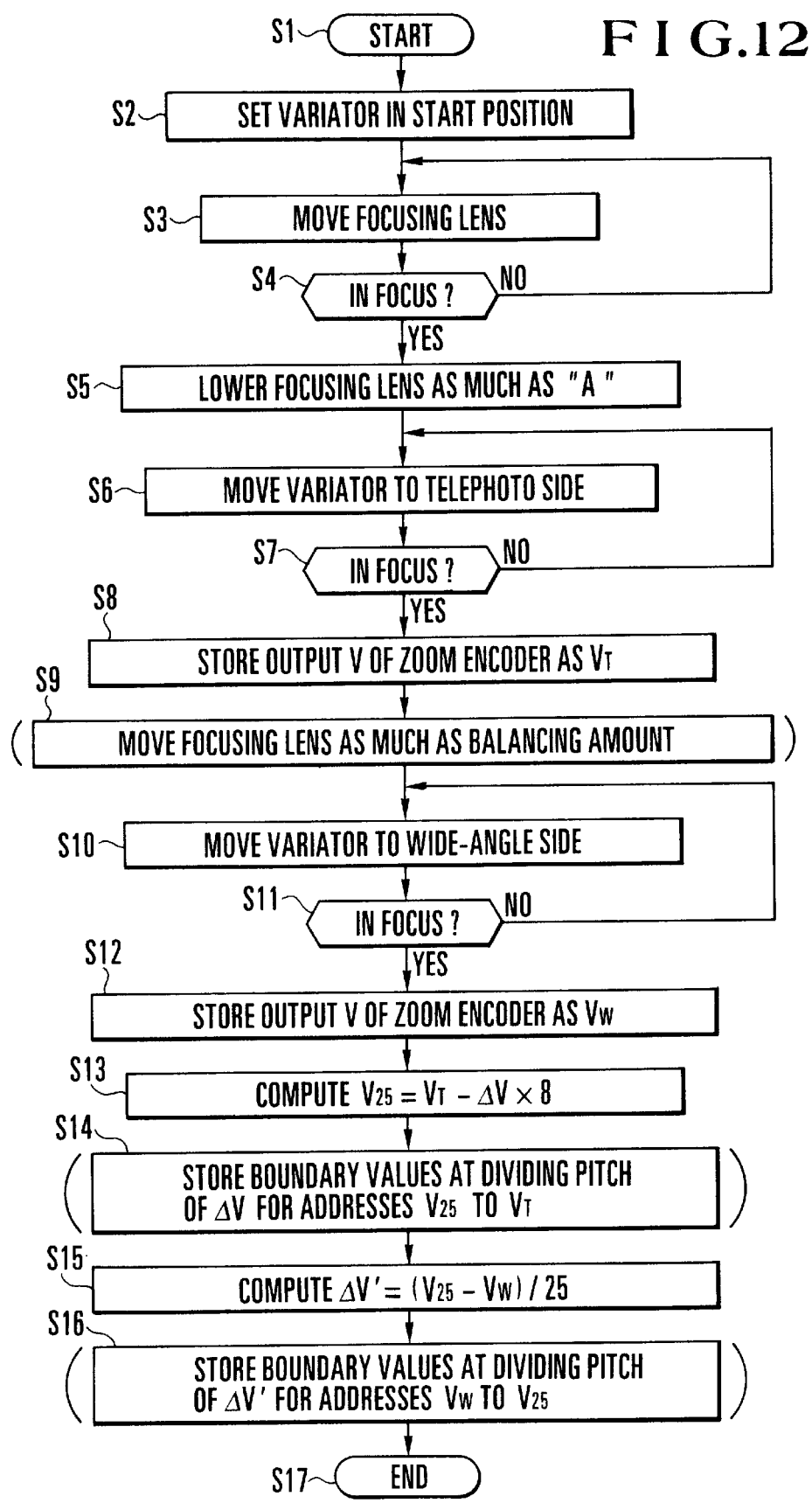
FIG. 12 is a flow chart showing a method of the first embodiment for determining the positions of the variator lens so as to correspond to stored data.

FIG. 12 shows the flow of an adjusting operation to be performed in the first embodiment. Referring to FIG. 12, the operation begins at a step S1. At a step S2, the position of the variator lens in the direction of the optical axis is set at the zooming position Za which corresponds to a point near to the top of a hill of the locus of movement of the focusing lens. At a next step S3, the focusing motor is driven to move the focusing lens for focus adjustment. In this instance, the object distance is set, for example, at an adjustment distance (for example, an infinity distance ∞) and some object of shooting such as a chart is arranged to be used for focus adjustment.

At a step S4, a check is made for an in-focus state and the focusing lens is moved until the in-focus state is obtained. Although it is not shown in the flow chart for simplification, an in-focus position is looked for, in actuality, while determining the moving direction for focusing by examining the correlation between a focus voltage signal related to the contrast of the object and the moving direction of the focusing lens. After confirmation of an in-focus state, the flow of operation comes to a step S5.

At the step 5, the position of the focusing lens is lowered by a design value. The word "lowered" as used here means to bring the focusing lens to a lower position as viewed on FIG. 10. In actuality, the focusing lens is either drawn out toward the object or drawn in toward the image plane according to the zoom type of the zoom lens. At a step S6, under this condition, the variator lens is driven to move to the telephoto end Ta. Then, at a step S7, a check is made for an in-focus state at each position of the variator lens, for example, by examining the above-stated focus voltage signal. When an in-focus state is obtained with the movement of the variator lens coming to an end, the present zoom position (the present position of the variator lens) becomes a zoom position at the telephoto end. Then, at a step S8, the output V of the zoom encoder obtained under that condition is stored as an output VT which defines the telephoto end position of the variator lens.

In a case where the variator lens is arranged to be driven with a stepping motor, the variator lens is set in a datum position before the step S1 of the flow of operation described above. According to the process for obtaining the datum position generally employed, a datum position sensor such as a photo-interrupter or the like is discretely arranged. Then, after the datum position is set at a predetermined value, input pulses are continuously counted to obtain an absolute position of the variator lens. Therefore, in that case, this absolute position is defined as the output VT.

At a step S9, the focusing lens is moved in the direction of the optical axis as much as a balancing amount which corresponds to a difference between the in-focus positions of the focusing lens obtained for the adjustment object distance at the telephoto end and at the wide-angle end. However, in a case where this balancing amount is "0" like in the case of FIG. 10, the focusing lens does not have to be moved.

At steps S10 and S1, in the same process as the process of setting the telephoto end, a zoom position, i.e., a position of the variator lens at the wide-angle end is determined by moving the variator lens to the wide-angle end. At a step S12, the output V of the zoom encoder indicating this zoom position is stored as an output VW which defines the wide-angle end position. By the steps described above, the telephoto end and wide-angle end positions of the variator lens and the positions of the focusing lens on the optical axis corresponding to these positions of the variator lens are determined.

Figure 8:
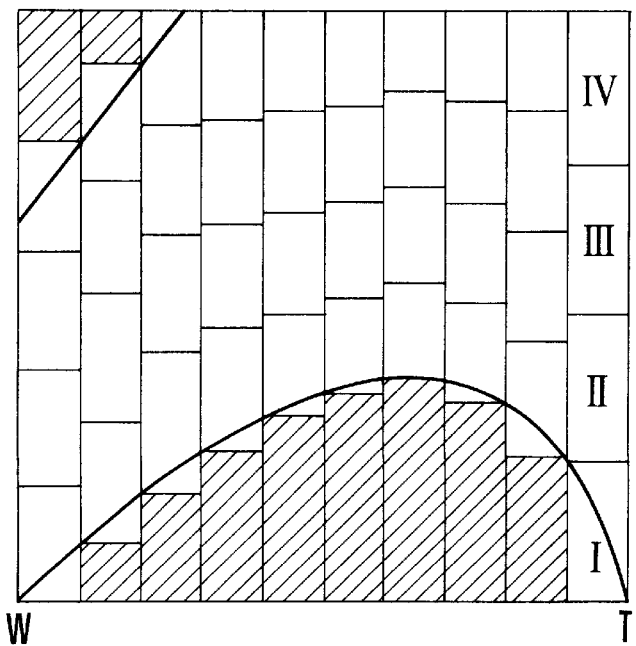
FIG. 8 shows the arrangement of areas made to correspond to data for zoom tracking.

At a step S13, an output V25 of the zoom encoder for the zoom position Za is computed. Assuming that a moving amount of the variator lens corresponding to one address of the zoom area in the stored data as a design value is $\Delta V$ in terms of an output difference of the zoom encoder, the value of the output V25 of the zoom encoder is computed as V25=VT−$\Delta V$×8, wherein "8" is obtained by subtracting 25 from 33 as the data stored is assumed to be divided into 33 in this case. In actually carrying out this invention, if the data is more finely divided, the FIG. 8 increases. At a step S14, the output of the zoom encoder for each address between the outputs V25 and VT is computed and stored. However, since the output value of each address can be obtained also by computing it as necessary, the storing action of the step S14 is not absolutely necessary.

At a step S15, in the case of this embodiment, a computing operation of "$\Delta V'=(V25-VW)/25$" is carried out for obtaining an output difference of the zoom encoder corresponding to one address of the zoom area between the remaining outputs VW to V25 for the area W–M as shown in FIG. 10.

The whole range from the telephoto end to the wide-angle end is thus divided by these steps into a number of areas corresponding to the stored data (33 in this embodiment). Besides, "a dividing ratio" is varied from a design value in such a way as to enable a driving action of the focusing lens to be carried out almost without any blur in a middle focal length position.

According to the conventional device, since the actual moving amount of the variator lens corresponding to one address of the zoom area set on the basis of the design value is constant throughout the zoom area (range) from the telephoto end to the wide-angle end, the above-stated "dividing ratio" is designed to be $\Delta V/\Delta V'=1$. In the case of this embodiment, on the other hand, the "dividing ratio" is arranged to show $\Delta V/\Delta V'\neq 1$ in the event of any error taking place on the part of the lens and $\Delta V/\Delta V'=1$ when there is no error.

Table 3 below shows a state of blur in the middle focal length position of the zoom area after adjustment is made as shown in FIG. 10 in the first embodiment. As shown in Table 3, all errors become zero. (In actuality, there arises a slight amount of error of the order of values below the decimal point). The advantageous effect of the adjustment method of this embodiment is manifest as compared with the conventional adjustment method shown in Table 1 and Table 2.

TABLE 3

| | | | | | | | | |
|---|---|---|---|---|---|---|---|---|
| (1) Position of variator on optical axis*: | 1 | 2 | 3 | 4 | 5 | 6 | 7 | — |
| (2) Memory data*: | 1 | 2 | 3 | 4 | 5 | 6.2 | 7.5 | — |
| (3) In-focus position after adjustment by first embodiment: | 1 | 2 | 3 | 4 | 5 | 6.2 | 7.5 | — |
| (4) Difference: | 0 | 0 | 0 | 0 | 0 | 0 | 0 | — |

TABLE 3-continued

| (1)*: | — | 23 | 24 | 25 | 26 | 27 | 28 | 29 | 30 | 31 | 32 | 33 |
|---|---|---|---|---|---|---|---|---|---|---|---|---|
| (2)*: | — | 42 | 43 | 43 | 42 | 41 | 39 | 36 | 32 | 26 | 15 | 0 |
| (3): | — | 42 | 43 | 43 | 42 | 41 | 39 | 36 | 32 | 26 | 15 | 0 |
| (4): | — | 0 | 0 | 0 | 0 | 0 | 0 | 0 | 0 | 0 | 0 | 0 |

Note: Mark * indicates stored (design) values.

A second embodiment of this invention is next described below.

In the case of the first embodiment described above, the moving range of the variator lens is divided into two zoom areas, i.e., an area between the telephoto end and the middle focal length position and an area between the middle focal length position and the wide-angle end, and the actual moving amount of the variator lens corresponding to one address is obtained for each of the two zoom areas. This method is sufficiently effective for the locus of an inner-focus type zoom lens generally used for video cameras. The adjusting operation shown in the flow chart of FIG. 12 necessitates almost no increase in the number of processes with the exception of addition of only the steps S13 to S16 to the conventional method of adjustment. Further, the additional process of writing-in of ΔV' imposes no particular burden as the outputs of the zoom encoder must be also written into an E²PROM according to the conventional adjusting method.

The second embodiment is arranged to adequately cope with such a case where the moving locus of the focusing lens takes a complex shape or where the locus is more severely affected by manufacturing fluctuations in respect of the focal length of the focusing lens.

While the basic concept of the first embodiment is to vary the moving amount of the variator lens corresponding to one address of the zoom area from the design value so as to adjust the actual locus to the data stored, the second embodiment is arranged to enhance the accuracy of the adjustment on the basis of the same basic concept.

Figure 13:
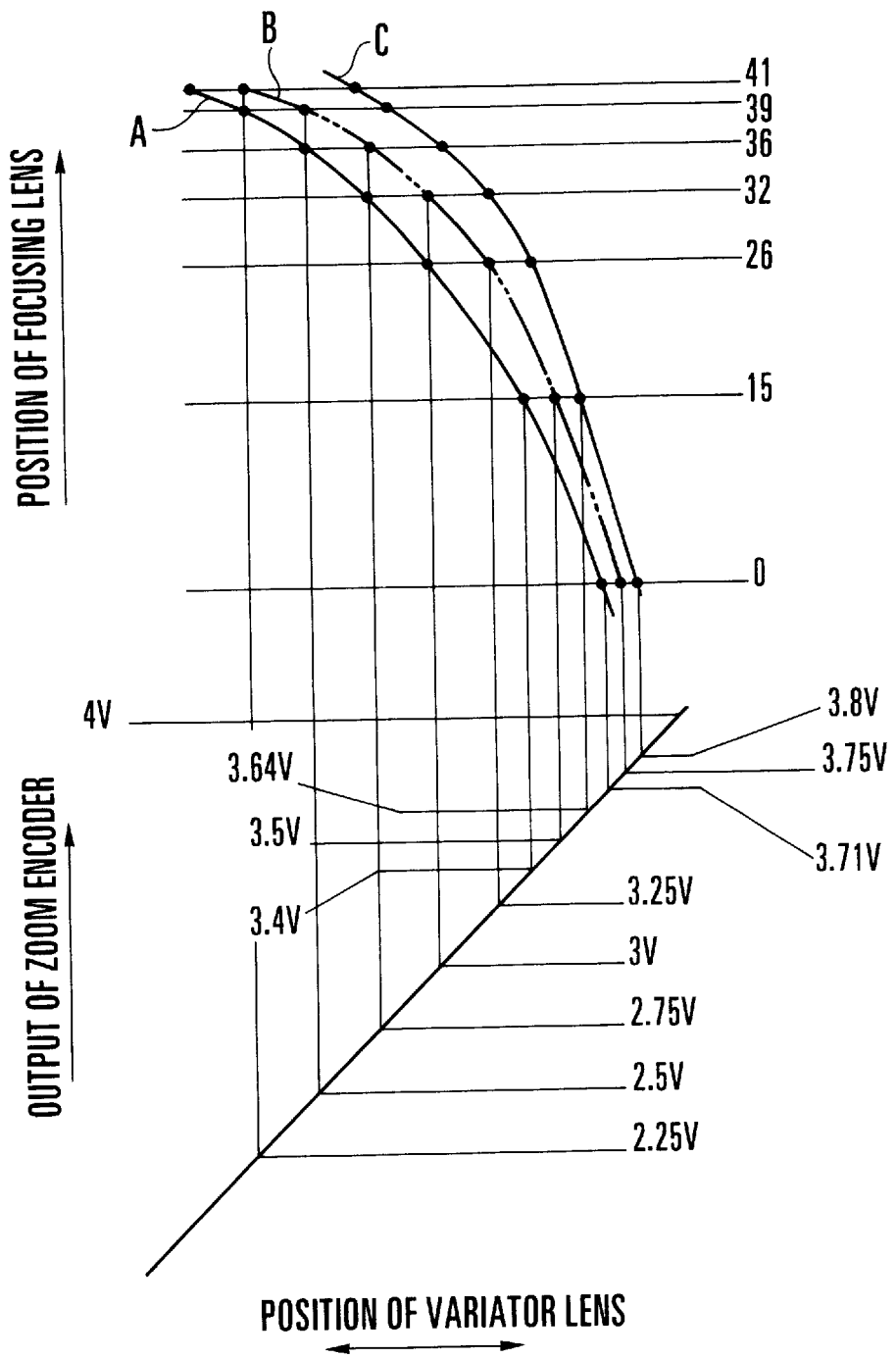
FIG. 13 shows a method of a second embodiment of this invention for determining the positions of the variator lens so as to correspond to stored data.

In FIG. 13, the position of the variator lens in the direction of the optical axis is shown on the abscissa axis and the position of the focusing lens in the direction of the optical axis is shown on the ordinate axis. Three loci A, B and C represent the loci of three zoom lenses manufactured on the basis of the same design values and show how the positions of the focusing lens resulting from a magnification varying action, i.e., the locus, of one zoom lens differ from those of others. Among these loci, the locus B consists of positions exactly conforming to design values. Assuming that the data stored is the same as the data described above with reference to FIG. 10, the data indicates that the position of the focusing lens is "0" at the address 33 which is the telephoto end position of the variator lens, "15" at the address 32, "26" at the address 31, and so on. In the case of the second embodiment, the focusing lens is moved on the basis of the data stored and a focusing action is performed by moving the variator lens at each position of the focusing lens. Then, the position of the variator lens at which an in-focus state is obtained is stored while being made to correspond to each of the addresses one after another. The lower half part of the graph of FIG. 13 shows the outputs of the zoom encoder corresponding to the respective positions of the variator lens. Table 4 below shows values read out in this manner as shown in FIG. 13, in which positions of the variator lens to be made to correspond to the respective addresses are indicated by outputs of the zoom encoder.

TABLE 4

| Addresses of variator lens: | 27 | 28 | 29 | 30 | 31 | 32 | 33 |
|---|---|---|---|---|---|---|---|
| Positions of variator lens A: | 2.04 | 2.24 | 2.5 | 2.74 | 3.0 | 3.4 | 3.71 |
| Positions of variator lens B: | 2.25 | 2.5 | 2.75 | 3.0 | 3.25 | 3.5 | 3.75 |
| Positions of variator lens C: | 2.73 | 2.85 | 3.08 | 3.25 | 3.4 | 3.64 | 3.8 |

Referring to Table 4, since the locus B of FIG. 13 is in conformity with the design values, a difference value (ΔV) between adjacent addresses is constant (0.25 V, in this case). On the other hand, the moving amount of the variator lens between adjacent addresses of the other loci A and C is not constant, as shown in Table 5 below.

TABLE 5

| Addresses: | 27–28 | 28–29 | 29–30 | 30–31 | 31–32 | 32–33 |
|---|---|---|---|---|---|---|
| ΔV of locus A: | 0.20 | 0.26 | 0.24 | 0.26 | 0.4 | 0.31 |
| ΔV of locus C: | 0.12 | 0.23 | 0.17 | 0.15 | 0.24 | 0.16 |

Figure 14:
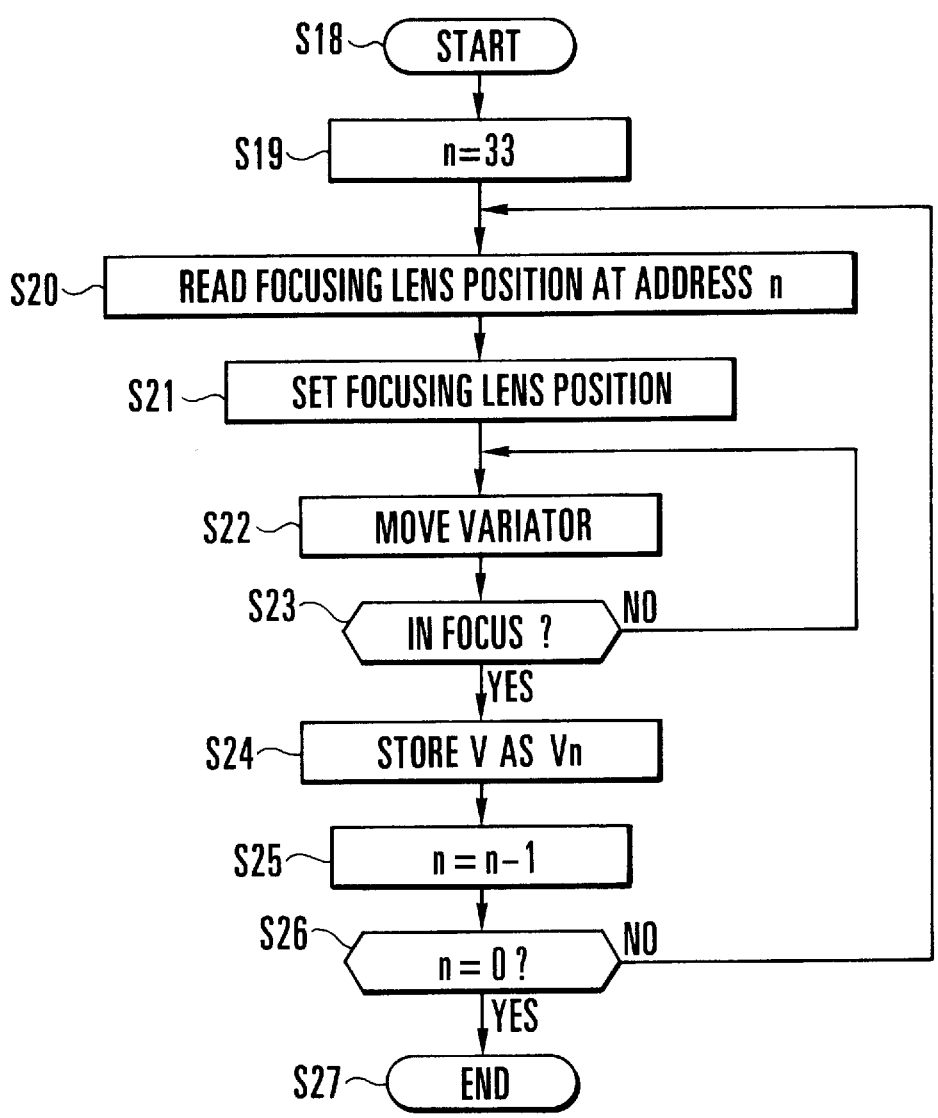
FIG. 14 is a flow chart showing the method of the second embodiment for determining the positions of the variator lens so as to correspond to stored data.

FIG. 14 is a flow chart showing an actual adjusting operation of the second embodiment. Referring to FIG. 14, the flow of the adjusting operation begins at a step S18. At a step S19, a maximum value of positions of the variator lens of the data stored is set. In this case, the maximum value is "33". At a step S20, a position of the focusing lens corresponding to the position of the variator lens at an address n is read out from the memory (storing part). In this case, the position of the focusing lens is "0" at the address 33, "15" at the address 32, and so on. At a step S21, each position of the focusing lens is set on the basis of a value thus read out by the step S20. However, since the first position of the variator lens which is at the telephoto end is determined in accordance with the tele-middle tracking adjustment, the position of the focusing lens at the telephoto end (at the address 33, in this case) is set to a position where an in-focus state is obtained, and a predetermined step number ("0" in this case) is assigned to that position. After that, the positions of the focusing lens are set with the step number of that position used as a datum point.

At steps S22 and S23, as described in the foregoing with reference to FIG. 12, an in-focus position is obtained by moving the variator lens. At a step S24, an output value of the zoom encoder obtained at the in-focus position is stored as Vn. At a step S25, "n=n-1" is computed. At a step S26, a check is made to find if the value n is "0". In other words, the positions of the variator lens corresponding to all addresses are obtained while carrying on the focusing action with the variator lens until the value n becomes "0".

According to this method, after completion of the tele-middle tracking adjustment, a position setting action for all data is performed in such a way as to trace the locus which is in conformity with the data stored. Therefore, the second embodiment is better than the first embodiment in terms of accuracy.

However, the method of measuring positions of the variator lens for all address in this manner takes much measuring time. This inconvenience may be avoided, for example, by an intermediate method whereby the positions of the variator lens are measured for every five addresses, instead of every point (address), and by dividing the result of measurement into five equal values and by allocating the equal values to the five addresses.

When the method of the second embodiment is carried out in the area between the address 33 and the address 25, the focusing lens is first moved from the in-focus position of the focusing lens obtained at the position of the variator lens at the telephoto end determined by the tele-middle tracking adjustment (the output of the zoom encoder obtained then is VT) to a position 43 of the focusing lens determined by the stored data at the address 25. After that, an in-focus state is obtained by moving the variator lens under this condition. Then, by using the output V25 obtained from the zoom encoder at that time, the output ΔV (representing a change taking place in the output of the zoom encoder corresponding to one address) for the area of the addresses 25 to 33 is obtained in a manner expressed as follows: ΔV=(VT−V25)/8.

Figure 1:
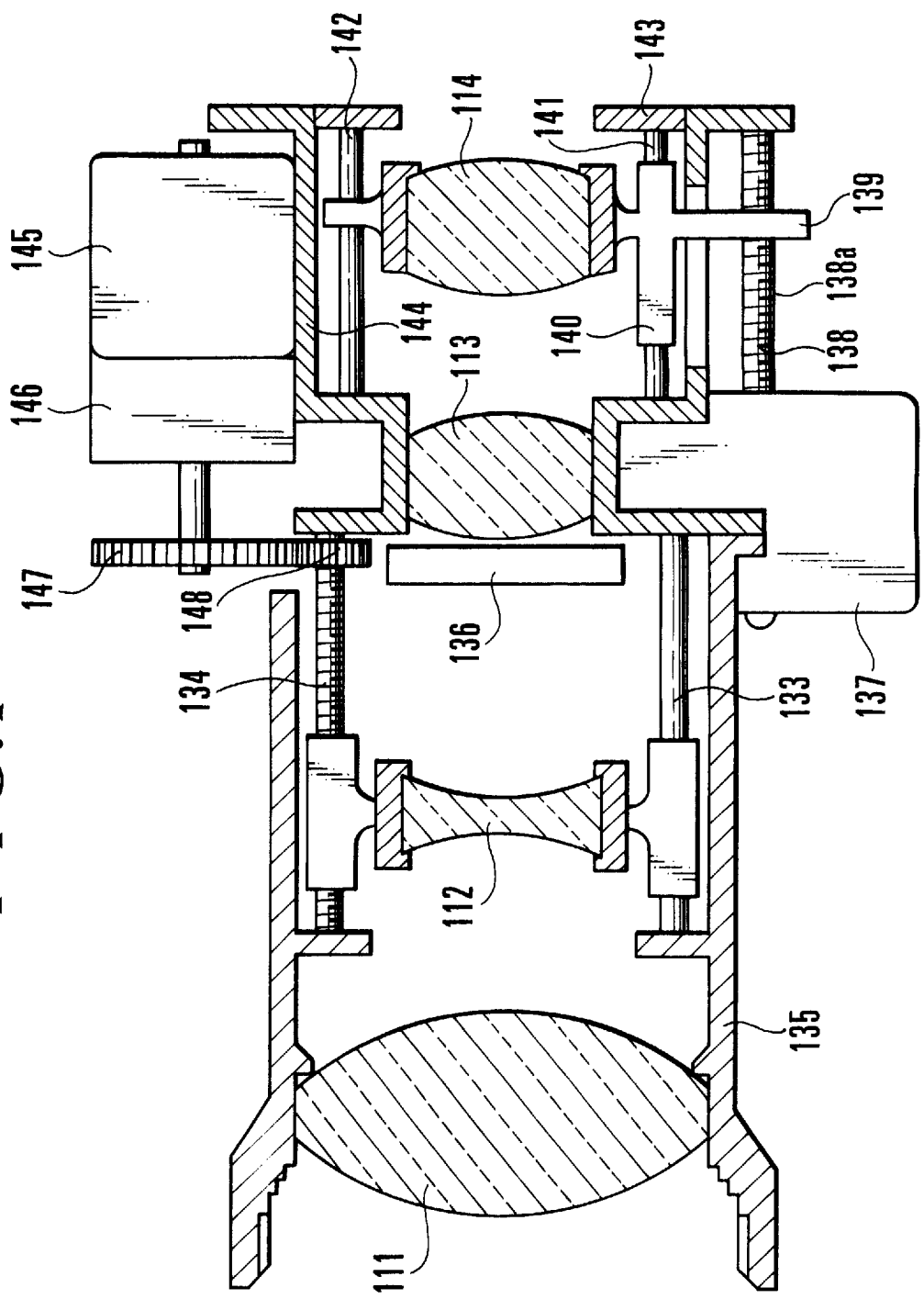
FIG. 1 is a sectional view showing a main part of a lens barrels to which this invention applies.
Figure 2:
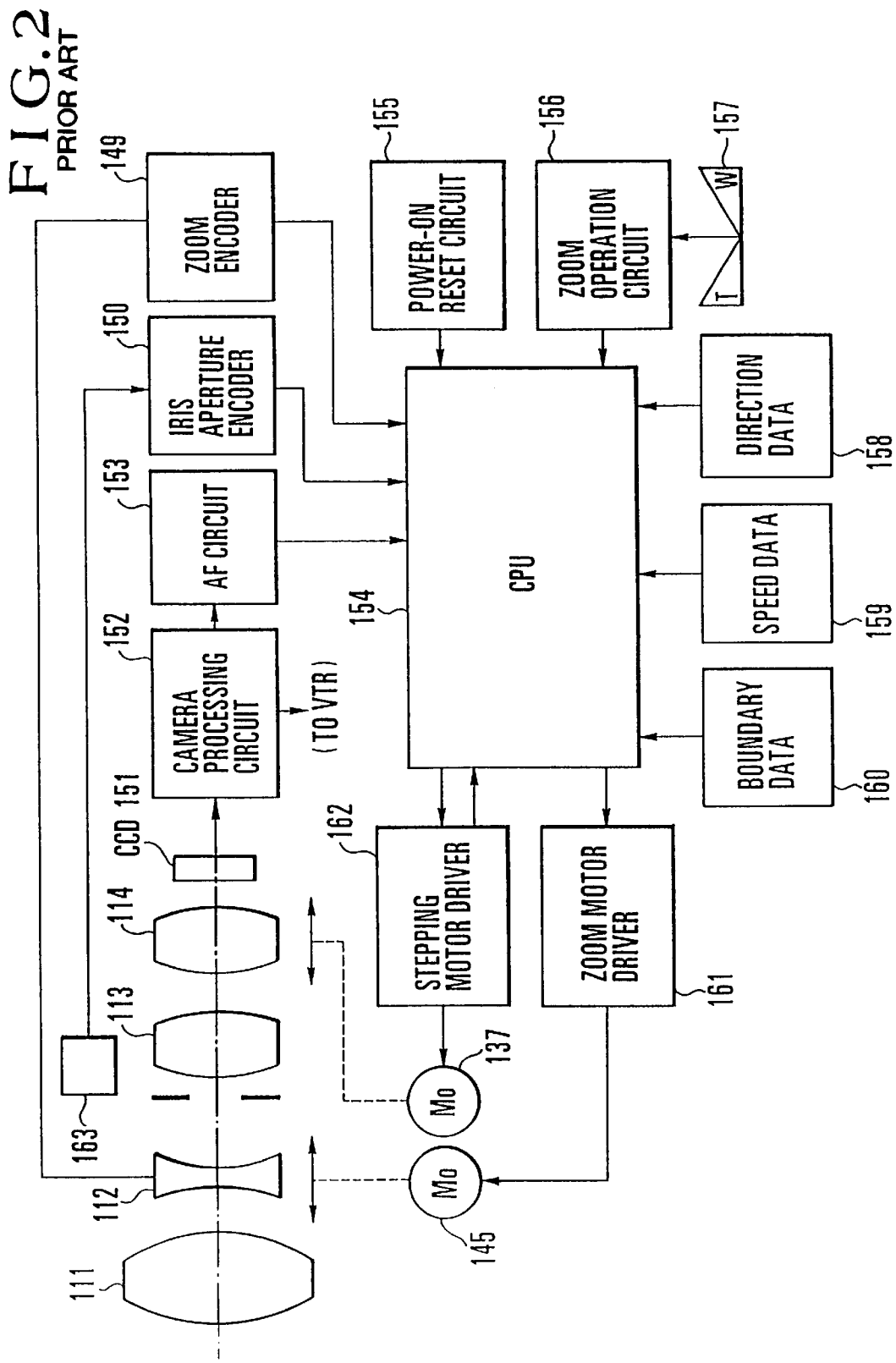
FIG. 2 is a block diagram showing the arrangement of a lens driving system to which this invention applies.
Figure 3:
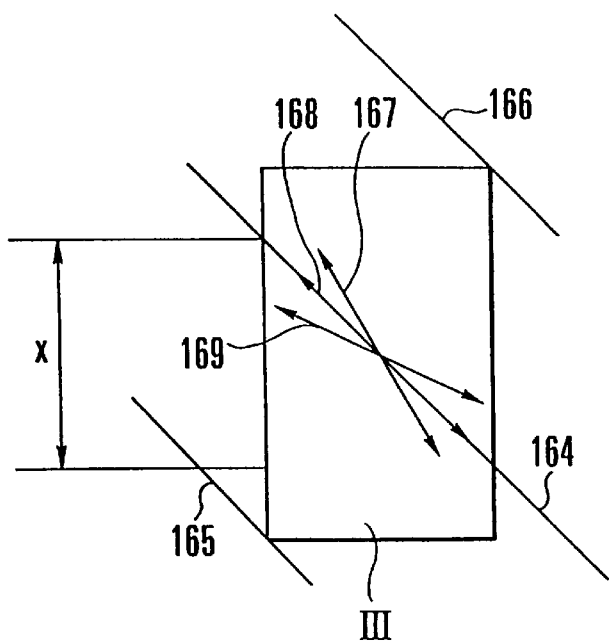
FIG. 3 shows by way of example the conventional method of using data for zoom tracking.
Figure 4:
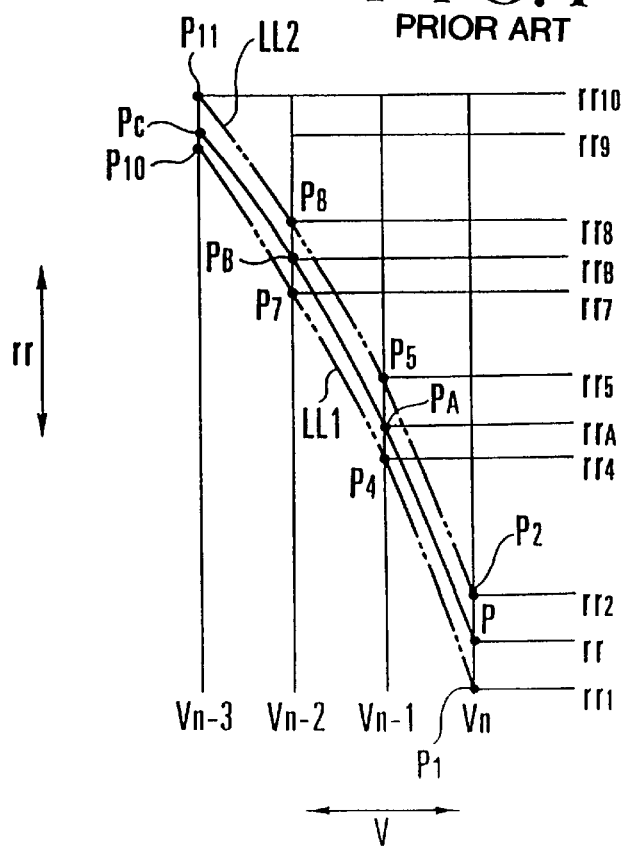
FIG. 4 shows by way of example the conventional method of using data for zoom tracking.
Figure 5:
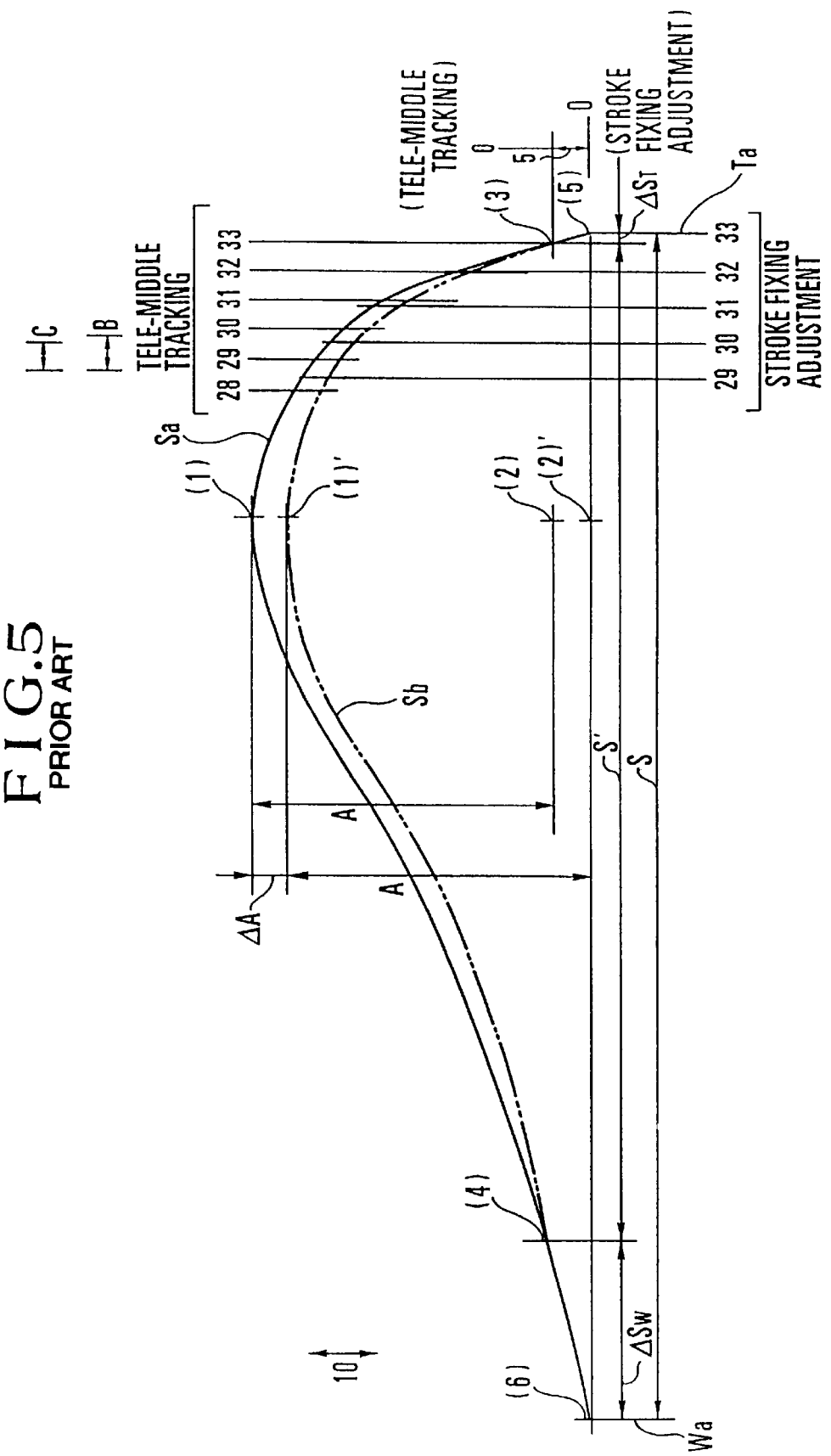
FIG. 5 shows the conventional method for zoom tracking adjustment.
Figure 6:
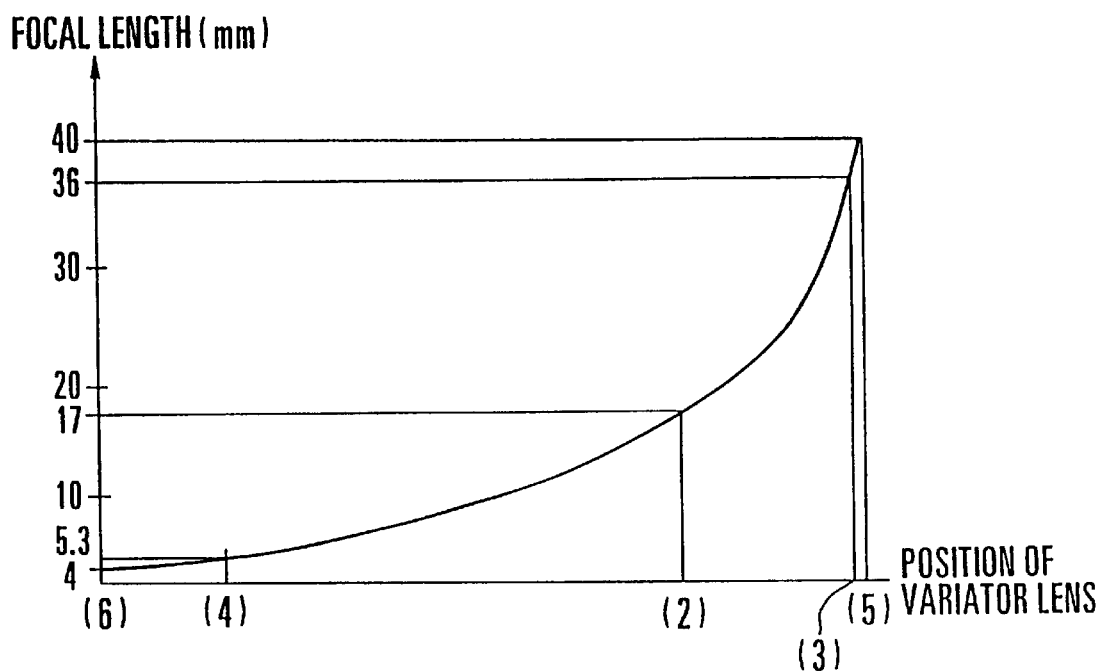
FIG. 6 shows the conventional method for zoom tracking adjustment.

The error between the first and second embodiments in the moving amount of the variator lens corresponding to one address in the area shown in FIG. 5 becomes ΔST/8. However, according to results of a study conducted by the inventor, the two embodiments show no difference between them in respect to a blur during the process of zooming with a zoom lens of about 20 magnifications employed.

Further, at a part such as the address 25 where there is almost no locus inclination, focusing cannot be accurately carried out with the variator lens. In the case of the locus such as the one described above by way of example with reference to FIG. 10, therefore, the method of the first embodiment may give a better result than the method of the second embodiment.

A third embodiment of this invention is next described as follows.

According to the arrangement of the first or second embodiment, zoom tracking adjustment can be carried out with almost no focus deviation (defocus) during the process of zooming. However, in the cases of the first and second embodiments, the moving amount of the variator lens from the telephoto end to the wide-angle end (a variator stroke) comes to differ from a design value, thereby bringing about some errors in the focal lengths obtained at the telephoto end and the wide-angle end and in zoom ratio.

To solve this problem, the third embodiment is arranged, in addition to the arrangements of the first and second embodiments, to finely adjust the position of the variator lens corresponding to the wide-angle end further from a position corresponding to the wide-angle end which is determined by the tele-middle tracking adjustment, in such a way as to make the variator stroke become equivalent to a design value.

The third embodiment is described below with reference to FIGS. 15 and 16 and Tables 6 and 7.

Figure 15:
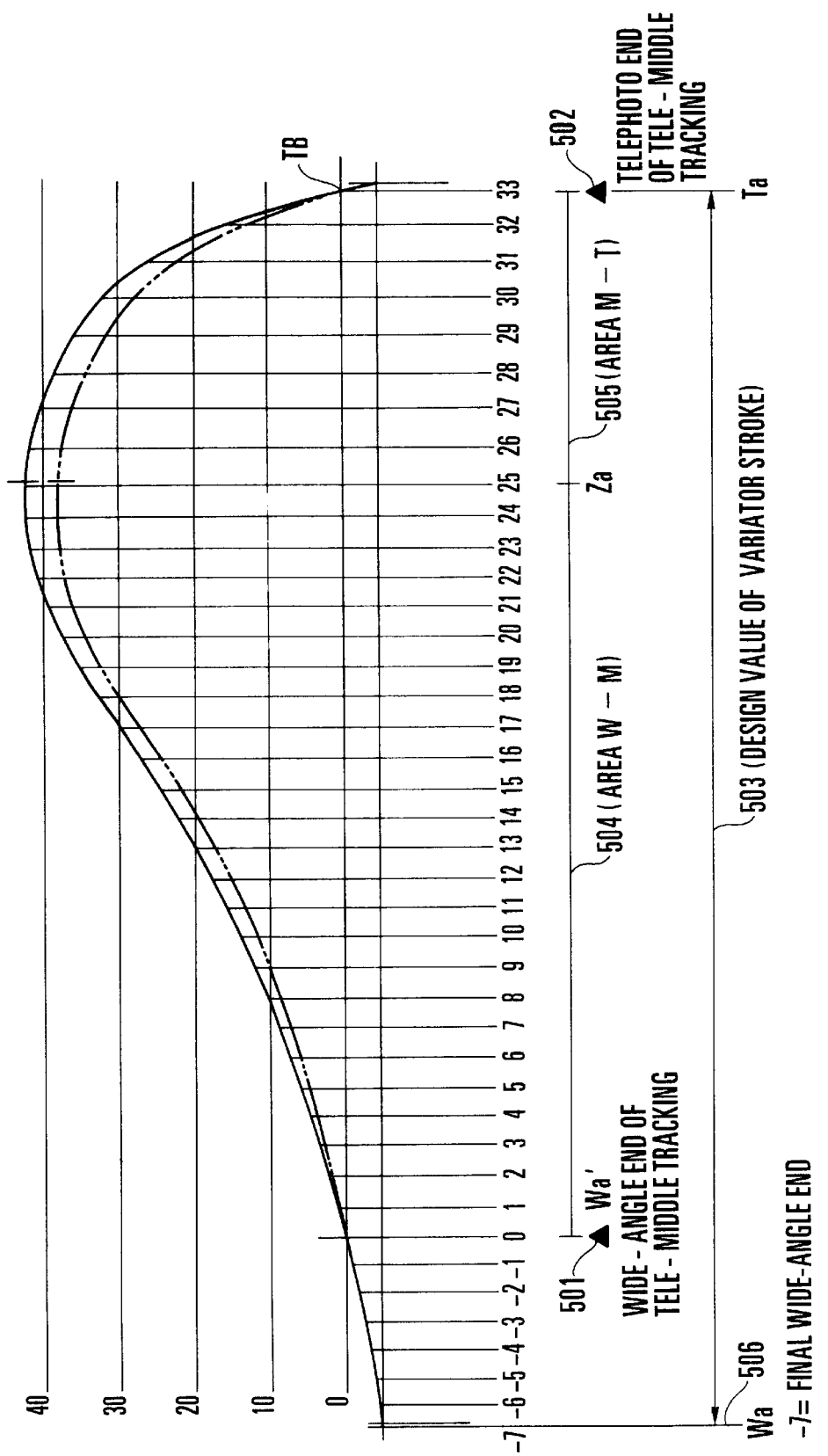
FIG. 15 shows an actual locus of the focusing lens and the positions of the variator lens of stored data made to correspond to the actual locus in a third embodiment of this invention.

FIG. 15 shows, like in FIG. 10, the position of the variator lens on the abscissa axis and the position of the focusing lens on the ordinate axis. The wide-angle-end and telephoto-end positions of the variator lens are set respectively at zoom positions 501 and 502 by the tele-middle tracking adjustment described in the foregoing with reference to FIG. 5. Then, stored data is allocated to an area in which the moving amount of the variator lens corresponding to one address of the zoom area almost coincides with a design value (the area M–T indicated as an area 505 in FIG. 15) and to another area in which the moving amount of the variator lens corresponding to one address of the zoom area is variable for dividing the range from the telephoto end to the wide-angle end into a predetermined number of addresses (the area W–M indicated as an area 504 in FIG. 15). A total moving amount of the variator lens thus not only conforms with a design value but sometimes becomes shorter or longer than the design value, according to the errors of focal length, thickness and refractive index of each lens group.

In the case of the third embodiment, while the wide-angle end and the telephoto end are determined by the tele-middle tracking adjustment as described above, the moving stroke of the variator lens between these ends are measured, and if the measured stroke differs from the design value, i.e., if the actual stroke is not within a predetermined range with respect to the designed value, the wide-angle end determined by the tele-middle tracking adjustment is not used and another wide-angle end is newly set at such a part that the stroke of the variator lens coincides with the design value (within a predetermined range). In that instance, with the wide-angle end position changed, the addresses between the wide-angle end and the telephoto end are either increased or decreased from the standard designed addresses (0 to 33 in this instance) according to a difference between the wide-angle end determined by the tele-middle tracking adjustment and the wide-angle end newly set.

For example, in the case of FIG. 15, the design value of the variator stroke is a stroke 503. If this amount of the variator stroke is assigned from the telephoto end, the position of the variator lens at the wide-angle end comes to a point 506. Therefore, if the moving amount of the variator lens corresponding to one address of data stored for the area W–M is allocated to each of the addresses one by one, the address of the final wide-angle end position of the variator lens becomes an address −7. Therefore, in this case, the data is allocated with the final wide-angle end set at the address −7 while the telephoto end is set at the address 33. Further, the data determined by the tele-middle tracking adjustment for the range between the wide-angle end and the telephoto end is identical with the data obtained by the conventional device.

In carrying out the above-stated method, the data to be stored for zoom tracking adjustment must be arranged to include the data for the extension made on the side of the wide-angle end from the range conforming to the design value. Table 6 below shows data arranged to include data for the extension range from −1 to −7. In the case of FIG. 15, the wide-angle end position is obtained at the address −7 of this range. In a case where the variator stroke between the wide-angle end and the telephoto end determined by the tele-middle tracking adjustment becomes smaller than the design value due to various error factors, as in the case of FIG. 15, the final wide-angle end position comes within a range from 0 to −7 as shown in Table 6. Conversely, if the variator stroke becomes larger than the design value, the wide-angle end position comes, for example, to an address +2.

TABLE 6

| (1) Positions of variator: | −10 | −9 | −8 | −7 | −6 | −5 | −4 | −2 | −1 | 0 |
|---|---|---|---|---|---|---|---|---|---|---|
| (2) Memory data: | −6.2 | −5.8 | −5.4 | −5 | −4.5 | −4.0 | −3.5 | −2 | 1 | 0 | continuing from (1) and (2)

| (1): | 1 | 2 | 3 | 4 | 5 | 6 | 7 | — | 23 | 24 | 25 | 26 | 27 | 28 | 29 | 30 | 31 | 32 | 33 |
|---|---|---|---|---|---|---|---|---|---|---|---|---|---|---|---|---|---|---|---|
| (2): | 1 | 2 | 3 | 4 | 5 | 6.2 | 7.5 | — | 42 | 43 | 43 | 42 | 41 | 39 | 36 | 32 | 26 | 15 | 0 |

Table 7 below shows by way of example how a moving amount of the variator lens corresponding to one address of data stored is determined.

TABLE 7

| Variator position | Allocation |
|---|---|
| 0~33: | allocated to tele-middle tracking |
| −n~0: | used for stroke fixing adjustment |

Figure 16:
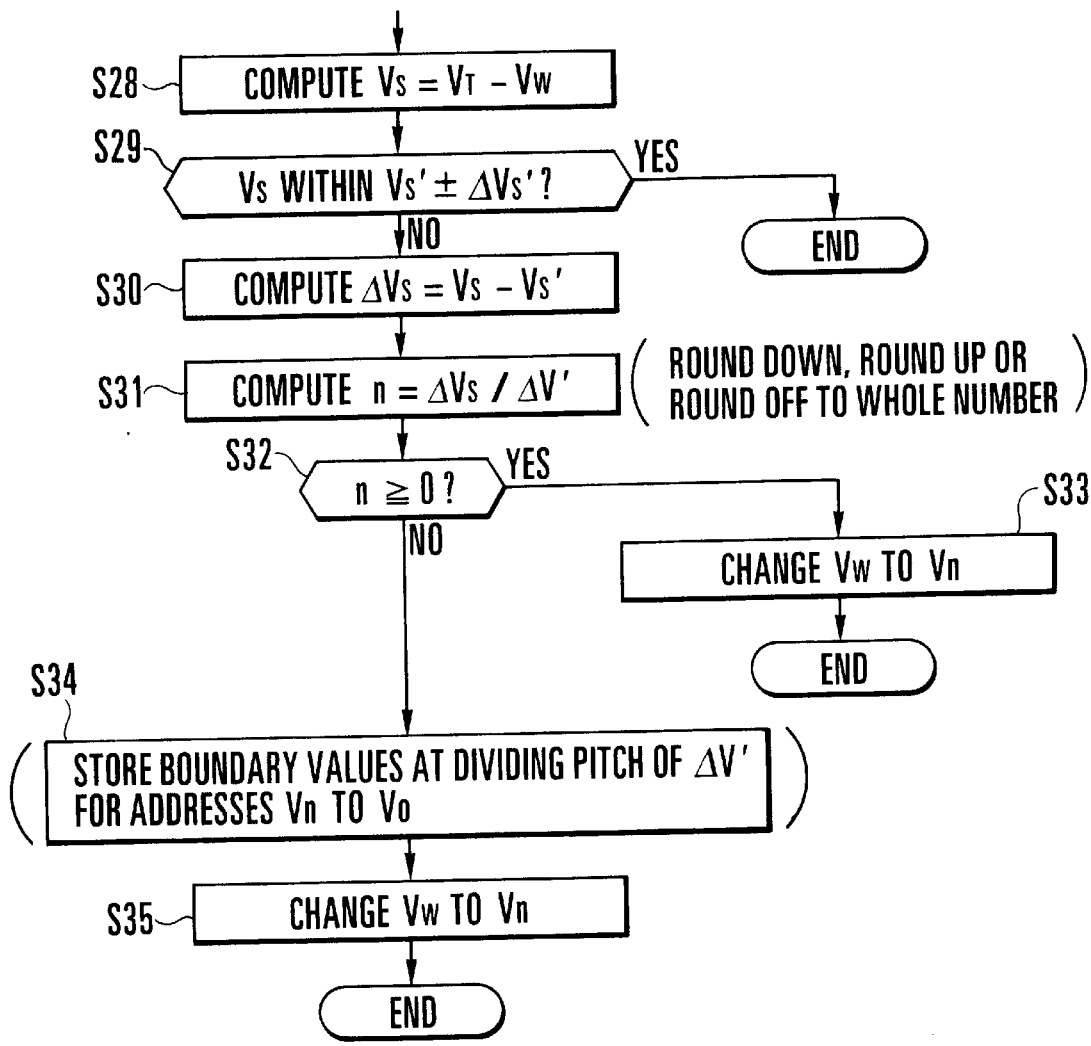
FIG. 16 is a flow chart showing a method of the third embodiment for determining the positions of the variator lens so as to correspond to stored data.

FIG. 16 is a flow chart showing the flow of operation of the third embodiment, continuing from the step S16 of the flow of the first embodiment of FIG. 12.

Referring to FIG. 16, at a step S28, a variator stroke VS from the telephoto end to the wide-angle end by the tele-middle tracking adjustment is computed. At a step S29, a check is made to find if this stroke VS is within the range of a design value VS'±ΔVS'. If so, the process of adjustment comes to an end.

If not, the flow of operation comes to a step S30 to compute an error amount ΔVS between the stroke VS and the design value VS'. At a step S31, "n=ΔVS/ΔV'" is computed. Decimal fractions may be processed in any suitable manner in the computing operation. At a step S32, a check is made to find if the result of tele-middle tracking adjustment is smaller than the design value. If so, the value n becomes a negative value. If not, the value n becomes a positive value. The result of the check made by the step S32 becomes YES if the value n is a positive value and the flow comes to a step S33. At the step S33, an encoder value VW which has been decided by the step S16 is changed from V0 to Vn.

If the value n is found to be a negative value, the flow comes to a step S34. At the step S34, boundary values between Vn and V0 are computed and stored. At a step S35, the value VW of the encoder obtained at the wide-angle end is changed to the value Vn.

The change in focal length resulting from a predetermined moving amount of the variator lens is less in the neighborhood of the wide-angle end than in the neighborhood of the telephoto end, and the zoom tracking curve of positions of the focusing lens in relation to positions of the variator lens also shows almost linear changes in the neighborhood of the wide-angle end. Therefore, data for a part between the wide-angle end position obtained by the tele-middle tracking adjustment and the final wide-angle end position may be interpolated by a simple computation instead of the method described above.

Further, while a negative address such as the address −7 is used in the case of the third embodiment, actual use of a negative address may be difficult in some case. In such a case, the stored data may be prepared in such a way as to permit all addresses to be handled as positive addresses. In the event of such a modification, if the variator stroke is in conformity with the design value, the wide-angle end is arranged to be at an address +k and the check by the step S32 of FIG. 16 is made for "n≧k".

In each of the first and third embodiments, the moving amount of the variator lens corresponding to one address of zooming within the area M−T is allocated according to the design value. However, in a case where a stepping motor is used for moving the variator lens and the number of pulses applied to the motor is used as an encoder, the moving amount of the variator lens conforming to the design value is not always an integral number of pulses. In such a case, any decimal number of pulses may be rounded down, rounded up or rounded off to count fractions of 5 and over as a unit and to disregard the rest, without departing from the spirit of this invention.

Information on the telephoto end and wide-angle end positions of the variator lens set by each of the embodiments described (output of the zoom encoder or the number of pulses counted from a datum position) or information on positions is preferably stored in an $E^2PROM$ (a writable ROM).

In the case of each embodiment described, this invention is applied to the rear-focus type lens which comprises four lens groups including the variator lens which is the second lens group and the focusing lens group which is the fourth lens group. This invention, however, applies also to other lens arrangements, such as a lens arranged as shown, for example, in FIGS. 5, 7 and 8 of Japanese Laid-Open Patent Application No. HEI 3-27011 or a lens composed of five lens groups including a variator lens as the second lens group and a focusing lens as the fourth lens group.

According to the arrangement of each embodiment described, the position of the focusing lens is shifted as much as a design value from a position of the focusing lens located at the furthest end of an area where an in-focus state is obtained for a predetermined object distance at a position of a middle focal length position of the variator lens. Then, the telephoto end position of the variator lens is set where an in-focus state can be obtained at this position of the focusing lens for the predetermined object distance. An area from this telephoto end position to the middle focal length position which is the above-stated moving end of the focusing lens is made to correspond to addresses of the variator lens of data stored on the basis of design values for zoom tracking with the moving amount of the variator lens arranged to be in conformity to a design value within this area. Any defocus state that tends to arise in the middle focal length position of the zoom area can be eliminated by this arrangement.

With the variator lens set in the telephoto end position determined in the above-stated manner, the focusing lens is moved from the position of the focusing lens where an in-focus state is obtained for the predetermined object distance at this position of the variator lens to a position of the focusing lens where an in-focus state is obtained for the predetermined object distance at a designed wide-angle end. Then, the position of the variator lens where an in-focus state is obtained for the predetermined object distance at this position of the focusing lens is set as the wide-angle end position of the variator lens. Then, an area between the wide-angle end position and a point near to a middle focal length position set by this manner is made to correspond to addresses of the variator lens of stored data formed on the basis of design values for zoom tracking by setting a moving amount of the variator lens for this area at such a value that maintains a stored number of addresses of the variator lens ranging from the address of the telephoto end and that of the wide-angle end. By this method, any defocus state arising at the middle focal length position of the zooming area can be eliminated.

Further, positions of the variator lens where positions of the focusing lens corresponding to the zoom addresses of the stored data formed on the basis of design values for zoom tracking are in conformity with the data are obtained and a defocus state which tends to arise at the middle focal length position of the zoom area is eliminated by causing the positions thus obtained of the variator lens to correspond to the data.

The fluctuations of focal lengths obtained at the telephoto end and the wide-angle end and the zoom ratio can be suppressed and minimized by setting the wide-angle end position of the variator lens at a position obtained by shifting the variator lens from the telephoto-end position determined in a manner similar to the methods described above as much as its stroke from the telephoto end to the wide-angle end which approximately corresponds to a design value.

Further, with the focusing lens moved from a position of the focusing lens where an in-focus state is obtained for a predetermined object distance at the telephoto end as much as a moving amount corresponding to a designed wide-angle end position of the focusing lens. Then, a position of the variator lens where an in-focus state can be obtained at this position of the focusing lens is obtained. Assuming that this position of the variator lens is a position A, the data stored on the basis of design values for zoom tracking between the wide-angle end and the telephoto end is made to correspond to positions of the variator lens between the position A and the telephoto end position of the variator lens. This arrangement not only eliminates any defocus state arising at the middle focal length position of the zoom area but also effectively minimizes fluctuations in focal length taking place at the telephoto and wide-angle ends and fluctuations in zoom ratio.

This invention applies to zoom lenses to be used for video cameras or the like.

While the relation between the variator lens and the focusing lens has been described in the foregoing, this invention is not limited to the position control over the variator lens and the focusing lens but applies also to any other arrangement for electronic control over a positional relation between two moving lens groups arranged to perform functions other than those of the variator lens and the focusing lens.

What is claimed is:

1. A lens position control device comprising:

a first lens arranged to be movable along an optical axis;

first lens position detecting means for detecting a position of said first lens in the direction of the optical axis;

a second lens arranged to be movable along the optical axis;

second lens position detecting means for detecting a position of said second lens in the direction of the optical axis; and driving control means for driving and controlling said first and second lenses, said driving control means including a storing part and a position setting part, wherein, in said storing part, is stored information related to positions of said second lens at which an in-focus state is retained respectively for a plurality of object distances with respect to each of a plurality of positions of said first lens, and wherein said position setting part is arranged to determine limit positions of a moving range of said first lens in the direction of the optical axis, to set at least one limit position (Ta) of the moving range to such a position of said first lens that a maximum value of difference between a position of said second lens where an in-focus state is retained for a predetermined object distance when said first lens is located at the one limit position (Ta) of the moving range and a position of said second lens where an in-focus state is retained for the predetermined object distance when said first lens is located at another position (Za) within the moving range coincides with a maximum value of contents stored in said storing part, and to cause the stored plurality of positions of said first lens within a moving range (M–T) which is smaller than the entire moving range of said first lens and which extends toward another limit position (Wa) of the moving range from the one limit position (Ta) to correspond to positions determined on the basis of a moving amount of said first lens stored beforehand in said storing part from the one limit position (Ta).

2. A device according to claim 1, wherein said driving control means is arranged to set as a reference a position (TB) of said second lens where an in-focus state is retained for the predetermined object distance when said first lens is located at the one limit position (Ta) of the moving range, to obtain a new position (Wa) where an in-focus state is retained after moving said second lens by a predetermined moving amount (Ya) from the reference, to set the new position (Wa) in said position setting part as the other limit position of the moving range of said first lens, and to cause the stored plurality of positions of said first lens within a remaining moving range (W–M) obtained by subtracting the smaller moving range (M–T) from the entire moving range of said first lens toward the one limit position (Ta) from the other limit position (Wa) of the moving range to correspond to positions determined on the basis of such a moving amount of said first lens that the stored plurality of positions of said first lens correspond to the determined positions between the one limit position (Ta) and the other limit position (Wa) of the moving range without any excess and shortage.

3. A lens position control device comprising:

a first lens arranged to be movable along an optical axis;

first lens position detecting means for detecting a position of said first lens in the direction of the optical axis;

a second lens arranged to be movable along the optical axis;

second lens position detecting means for detecting a position of said second lens in the direction of the optical axis; and driving control means for driving and controlling said first and second lenses, said driving control means including a storing part and a position setting part, wherein, in said storing part, is stored information related to positions of said second lens at which an in-focus state is retained respectively for a plurality of object distances with respect to each of a plurality of positions of said first lens, and wherein said position setting part is arranged to determine limit positions of a moving range of said first lens in the direction of the optical axis, to set as a reference a position (TB) of said second lens where an in-focus state is retained for a predetermined object distance when said first lens is located at one limit position (Ta) of the moving range, to move said second lens from the reference to a position of said second lens stored in said storing part, and to cause a position of said first lens where an in-focus state is retained with the stored position of said second lens to correspond to a stored position of said first lens.

4. A device according to claim 3, wherein said position setting part is arranged to set the one limit position (Ta) of the moving range to such a position of said first lens that a maximum value of difference between a position of said second lens where an in-focus state is retained for the predetermined object distance when said first lens is located at the one limit position (Ta) of the moving range and a position of said second lens where an in-focus state is retained for the predetermined object distance when said first lens is located at another position within the moving range coincides with a maximum value of contents stored in said storing part.

5. A lens position control device comprising:
   a first lens arranged to be movable along an optical axis;
   first lens position detecting means for detecting a position of said first lens in the direction of the optical axis;
   a second lens arranged to be movable along the optical axis;
   second lens position detecting means for detecting a position of said second lens in the direction of the optical axis; and
   driving control means for driving and controlling said first and second lenses, said driving control means including a storing part and a position setting part,
   wherein, in said storing part, is stored information related to positions of said second lens at which an in-focus state is retained respectively for a plurality of object distances with respect to each of a plurality of positions of said first lens, and
   wherein said position setting part is arranged to determine limit positions of a moving range of said first lens in the direction of the optical axis, to set at least one limit position (Ta) of the moving range to such a position of said first lens that a maximum value of difference between a position of said second lens where an in-focus state is retained for a predetermined object distance when said first lens is located at the one limit position (Ta) of the moving range and a position of said second lens where an in-focus state is retained for the predetermined object distance when said first lens is located at another position (Za) within the moving range coincides with a maximum value of contents stored in said storing part, and to set as another limit position (Wa) of the moving range of said first lens a position to which said first lens has moved a predetermined moving amount from the one limit position (Ta).

6. A device according to claim 5, wherein said driving control means is arranged to set as a reference a position (TB) of said second lens where an in-focus state is retained for the predetermined object distance when said first lens is located at the one limit position (Ta) of the moving range, to obtain a new position (Wa') of said first lens where an in-focus state is retained after moving said second lens a predetermined moving amount from the reference, to cause a position among the stored plurality of positions of said first lens which corresponds to one limit position of the moving range of said first lens to correspond to the one limit position (Ta) of the moving range, and to cause a position among the stored plurality of positions of said first lens which corresponds to another limit position of the moving range of said first lens to correspond to the new position (Wa') of said first lens.

7. A device according to any one of claims 1 to 6, wherein said first lens is a variator lens for varying magnification, and said second lens is a focusing lens.

8. A device according to any one of claims 1 to 6, wherein said first lens is a variator lens for varying magnification, and said second lens is a focusing lens, and wherein the one limit position of the moving range is a position where a maximum focal length is obtained, and the other limit position of the moving range is a position where a minimum focal length is obtained.

9. A device according to any one of claims 1 to 6, wherein said position setting part includes a writable ROM.

10. An optical apparatus arranged to form an object image on a predetermined plane by using a plurality of lenses set by said lens position control device according to any one of claims 1 to 6.

11. An apparatus for controlling a position of a lens, said apparatus comprising:
    a variator lens;
    a focus lens;
    drive control means for driving and controlling positions of said variator lens and said focus lens in an optical axis direction, said drive control means including a memory part and a position setting part,
    wherein said memory part stores information about positions of said focus lens which maintain an in-focus state relative to distances of plural objects, the information being stored in every one of plural divided zones of a total movement range of said variator lens, the movement range being divided into the plural divided zones by plural positions of said variator lens, and
    wherein said position setting part performs a setting operation including (a) moving said variator lens to a position (Za) where the movement amount of said focus lens becomes largest relative to a telephoto end on the basis of predetermined values of said zoom lens, (b) moving said focus lens, with said variator lens being stopped at the position (Za), so as to focus on an object of a predetermined distance, (c) moving said focus lens by a predetermined amount from an in-focus position relative to the object of the predetermined distance with said variator lens being stopped at the position (Za), (d) moving said variator lens toward the telephoto end on the basis of predetermined values of said zoom lens, with said focus lens being stopped after movement of the predetermined amount, so as to store in said memory part a position (Ta) of said variator lens in-focus relative to the object of the predetermined distance, and (e) coinciding the dividing pitch in each of the divided zones in the movement range from the position (Za) to the position (Ta) to the dividing pitch in each of the divided zones in the movement range from the position (Za) to the telephoto end on the basis of predetermined values of said zoom lens.

12. An apparatus according to claim 11, wherein the setting operation of said position setting part further includes moving said variator lens toward a wide end on the basis of predetermined values of said zoom lens, with said focus lens being stopped at the in-focus position relative to the object of the predetermined distance at the position (Ta), so as to store a position (Wa) of said variator lens in-focus relative to the object of the predetermined distance in said memory part, and resetting the dividing pitch in each of the divided zones in the movement range from the position (Wa) to the position (Za) in such a manner that the number of all divided zones does not deviate from a predetermined number.

13. An apparatus according to claim 11, wherein the setting operation of said position setting part further includes moving said focus lens by a predetermined amount (Ya) from the in-focus position relative to the object of the predetermined distance at the position (Ta), and moving said variator lens toward a wide end on the basis of predetermined values of said zoom lens with said focus lens being stopped after the movement of the predetermined amount (Ya) so as to store a position (Wa) of said variator lens in-focus relative to the object of the predetermined distance in said memory part, and resetting the dividing pitch in each of the divided zones in the movement range from the position (Wa) to the position (Za) in such a manner that the number of all divided zones does not deviate from a predetermined number.

14. An apparatus according to claim 11, wherein the setting operation of said position setting part further includes storing a position (Wa) of said variator lens which is obtained by adding the movement amount of said variator lens from a wide end to the telephoto end on the basis of predetermined values of said zoom lens to the position (Ta).

15. An apparatus according to claim 11, wherein the setting operation of said position setting part further includes (i) moving said variator lens toward a wide end on the basis of predetermined values of said zoom lens, with said focus lens being stopped at an in-focus position relative to the object of the predetermined distance at the position (Ta), to store a position (Wa') of said variator lens in-focus relative to the object of the predetermined distance in said memory part, (ii) resetting the dividing pitch in each of the divided zones in the movement range from the position (Wa') to the position (Za) in such a manner that the number of all divided zones does not deviate from a predetermined number, (iii) storing a position (Wa) of said variator lens which is obtained by adding the movement amount of said variator lens from the wide end to the telephoto end on the basis of predetermined values of said zoom lens to the position (Ta), and (iv) increasing or decreasing the number of the divided zones in the movement range from the position (Wa) to the position (Za) relative to the number of the divided zones in the movement range from the position (Wa') to the position (Za).

16. An apparatus according to claim 11, wherein the setting operation of said position setting part further includes (i) moving said focus lens by a predetermined amount (Ya) from the in-focus position relative to the object of the predetermined distance at the position (Ta), (ii) moving said variator lens toward a wide end on the basis of predetermined values of said zoom lens, with said focus lens being stopped after movement of the predetermined amount (Ya), so as to store in said memory part the position (Wa') of said variator lens in-focus relative to the object at the predetermined distance, (iii) resetting the dividing pitch in each of the divided zones in the movement range from the position (Wa') to the position (Za) in such a manner that the number of all divided zones does not deviate from a predetermined number, (iv) storing a position (Wa) of said variator lens which is obtained by adding a movement amount of said variator lens from the wide end to the telephoto end on the basis of predetermined values of said zoom lens to the position (Ta), and (v) increasing or decreasing the number of the divided zones in the movement range from the position (Wa) to the position (Za) relative to the number of the divided zones in the movement range from the position (Wa') to the position (Za).

17. An apparatus for controlling a position of a lens, said apparatus comprising:

a variator lens;

a focus lens;

drive control means for driving and controlling positions of said variator lens and said focus lens in an optical axis direction, said drive control means including a memory part and a position setting part, wherein said memory part stores information about positions of said focus lens which maintains an in-focus state relative to distances of plural objects, the information being stored in every one of plural divided zones of a total movement range of said variator lens, the movement range being divided into the plural divided zones by plural positions of said variator lens, and wherein said position setting part performs a setting operation including (a) moving said variator lens to a position (Za) where the movement amount of said focus lens becomes largest relative to a telephoto end on the basis of predetermined values of said zoom lens, (b) moving said focus lens with said variator lens being stopped at the position (Za) to focus on an object of a predetermined distance, (c) moving said focus lens to a position (TB) from the in-focus position relative to the object of the predetermined distance, (d) moving said variator lens toward the telephoto end on the basis of predetermined values of said zoom lens, with said focus lens being stopped at the position (TB), to store in said memory part a position (Ta) of said variator lens in-focus relative to the object at the predetermined distance, (e) moving said focus lens to a predetermined position different from the in-focus position relative to the object of the predetermined distance at the position (Za) from the position (TB), and (f) moving said variator lens toward the wide end on the basis of predetermined values of said zoom lens, with said focus lens being stopped at the predetermined position, to store in said memory part a position of said variator lens in-focus relative to the object of the predetermined distance.

18. An optical apparatus comprising said apparatus according to any one of claims 11 to 17 and being arranged to form an object on a predetermined plane by using said variator lens and said focus lens.

* * * * *

UNITED STATES PATENT AND TRADEMARK OFFICE
CERTIFICATE OF CORRECTION

PATENT NO. : 5,854,711
DATED : December 29, 1998
INVENTOR(S) : Naoya Kaneda

It is certified that error appears in the above-identified patent and that said Letters Patent is hereby corrected as shown below:

Title Page:
Item [30] Foreign Application Priority Data:
"August 2, 1995" should read -- February 8, 1995 --.

Column 8:
Line 26, "0 at" should read -- at --.

Column 12:
Line 41, "a s" should read -- as --.

Column 13:
Line 58, "of actual measured values, of actual" should read -- of a hill of a locus Sa of actual measured values --.
Line 59, "measured values," should be deleted.

Column 15:
Line 33, "step 5," should read -- step S5, --.

Column 16:
Line 1, "S1," should read -- S11, -- and "same process" should read -- same manner --.

Signed and Sealed this

Seventh Day of August, 2001

Attest:

NICHOLAS P. GODICI
Attesting Officer  Acting Director of the United States Patent and Trademark Office